United States Patent [19]

Shimoi et al.

[11] Patent Number: 5,652,857
[45] Date of Patent: Jul. 29, 1997

[54] DISK CONTROL APPARATUS FOR RECORDING AND REPRODUCING COMPRESSION DATA TO PHYSICAL DEVICE OF DIRECT ACCESS TYPE

[75] Inventors: Hiroyuki Shimoi; Naoaki Okayasu; Satoru Kaneko; Shigeru Honmura; Hidetomo Maeda, all of Kawasaki, Japan

[73] Assignee: Fujitsu Limited, Kawasaki, Japan

[21] Appl. No.: 593,648

[22] Filed: Jan. 29, 1996

[30] Foreign Application Priority Data

Mar. 9, 1995 [JP] Japan .................. 7-049540

[51] Int. Cl.$^6$ .................................. G06F 12/08
[52] U.S. Cl. .................. 395/440; 395/463; 395/888; 395/441; 395/442
[58] Field of Search ...................... 395/440, 441, 395/442, 463, 888, 197.02

[56] References Cited

U.S. PATENT DOCUMENTS 4,467,421  8/1984  White ............................ 395/445
5,393,445  2/1995  Takamoto et al. ............. 395/800
5,403,639  4/1995  Belson et al. .................. 395/620

FOREIGN PATENT DOCUMENTS 59-231683  12/1984  Japan .
04284551  10/1992  Japan .
05189157   7/1993  Japan .
0628108    2/1994  Japan .

*Primary Examiner*—Matthew M. Kim
*Attorney, Agent, or Firm*—Greer, Burns & Crain, Ltd

[57] ABSTRACT

The logic blocks which were swept out from a non-compression cache memory are compressed by a compressing circuit and are combined to a compression group (logic sector size) of a fixed length in which a plurality of compression data are collected by a compression group forming unit. The compression group is stored into a logic sector of a disk drive through a compression cache memory. A correspondence relation with a plurality of logic blocks included in the logic sectors of a disk is registered in a mapping table. In response to a request by the logic block number from the host computer, the logic sector (compression group) of the disk drive is read and written with reference to the mapping table.

39 Claims, 32 Drawing Sheets

| 40-1 | 40-2 | 40-3 | 40-4 | 40-5 |
|---|---|---|---|---|
| LOGIC BLOCK NUMBER (ADDRESS) | ADDRESS IN THE CACHE | DATA LENGTH | COMPRESSION FLAG | UPDATING FLAG |
| ⋮ | ⋮ | ⋮ | ⋮ | ⋮ |
| | | | | |
| | | | | |

40

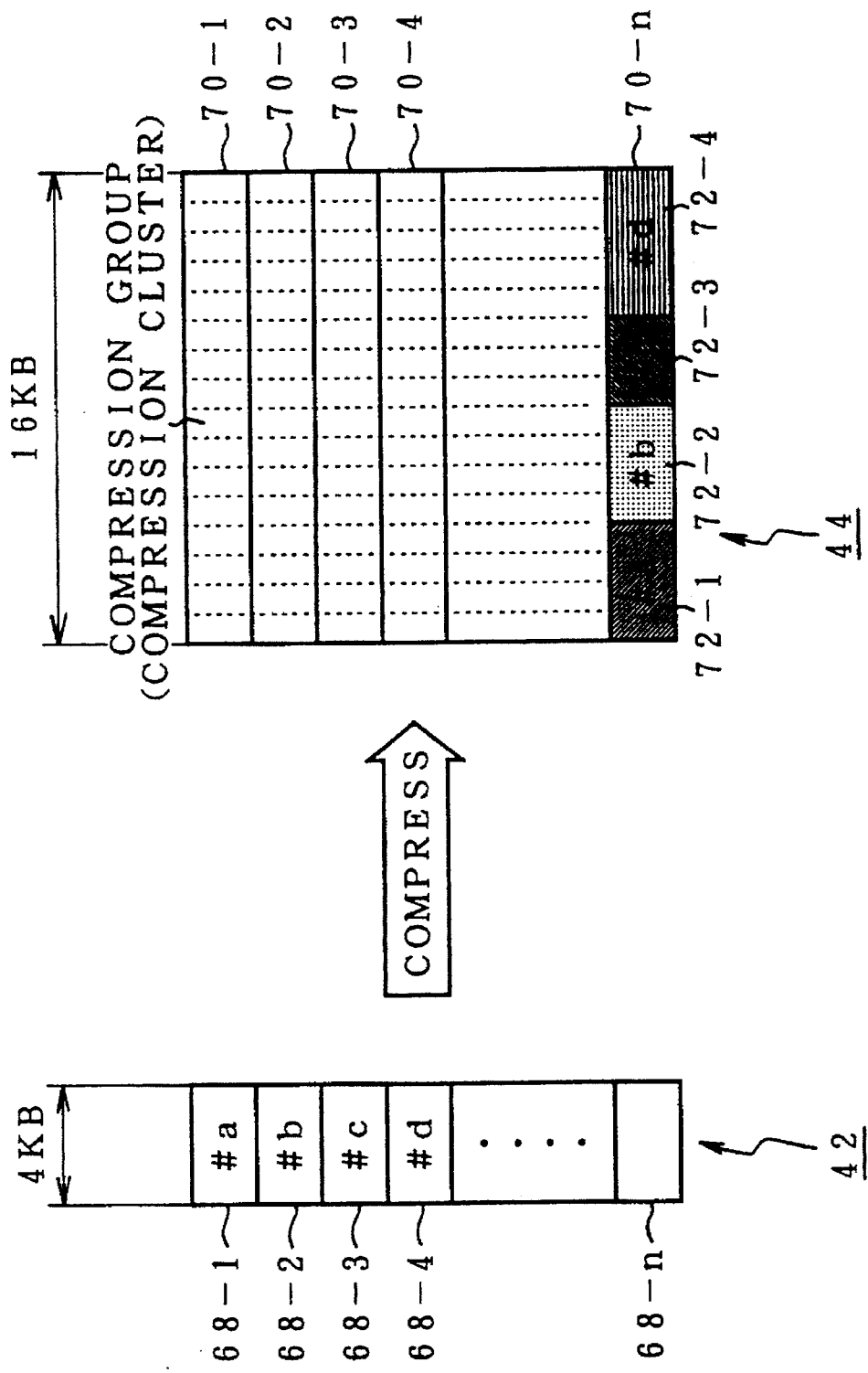

FIG. 10

| 54-1 | 54-2 | 54-3 | 54-4 |
|---|---|---|---|
| LOGIC BLOCK NUMBER | LOGIC SECTOR NUMBER | THE NUMBER OF OFFSET SECTORS | SECTOR LENGTH |
| | | | |
| | | | |
| ⋮ | | | |
| | | | |

F I G. 1 1
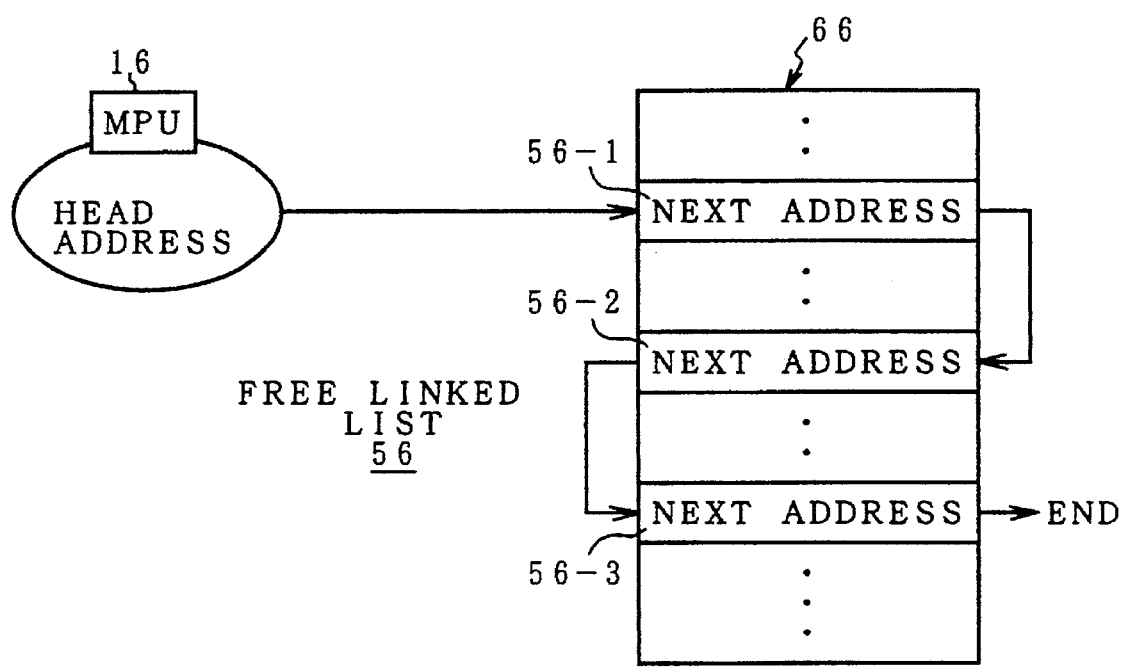

FIG. 29

42 NON-COMPRESSION CACHE MEMORY

| #50 | #51 | #52 | #53 | #54 | #55 | #56 | #57 |

68-1, 68-2, 68-3, 68-4, 68-5, 68-6, 68-7, 68-8

⇧ COMPRESS

44 COMPRESSION CACHE MEMORY

| #50 | #51 | #52 | #53 | #54 | #55 |
| #55 | #56 | #57 | | | |

70-1, 70-2

| LOGIC SECTOR NUMBER | LOGIC BLOCK NUMBER | POSITION FLAG |
|---|---|---|
| #50 | 10 | 1 |
| #51 | 10 | 2-1 |
| #52 | 10 | 2-2 |
| #53 | 10 | 2-3 |
| #54 | 10 | 2-4 |
| #55 | 10 | 3 |
| #56 | 11 | 2-5 |
| #57 | 11 | 2-6 |

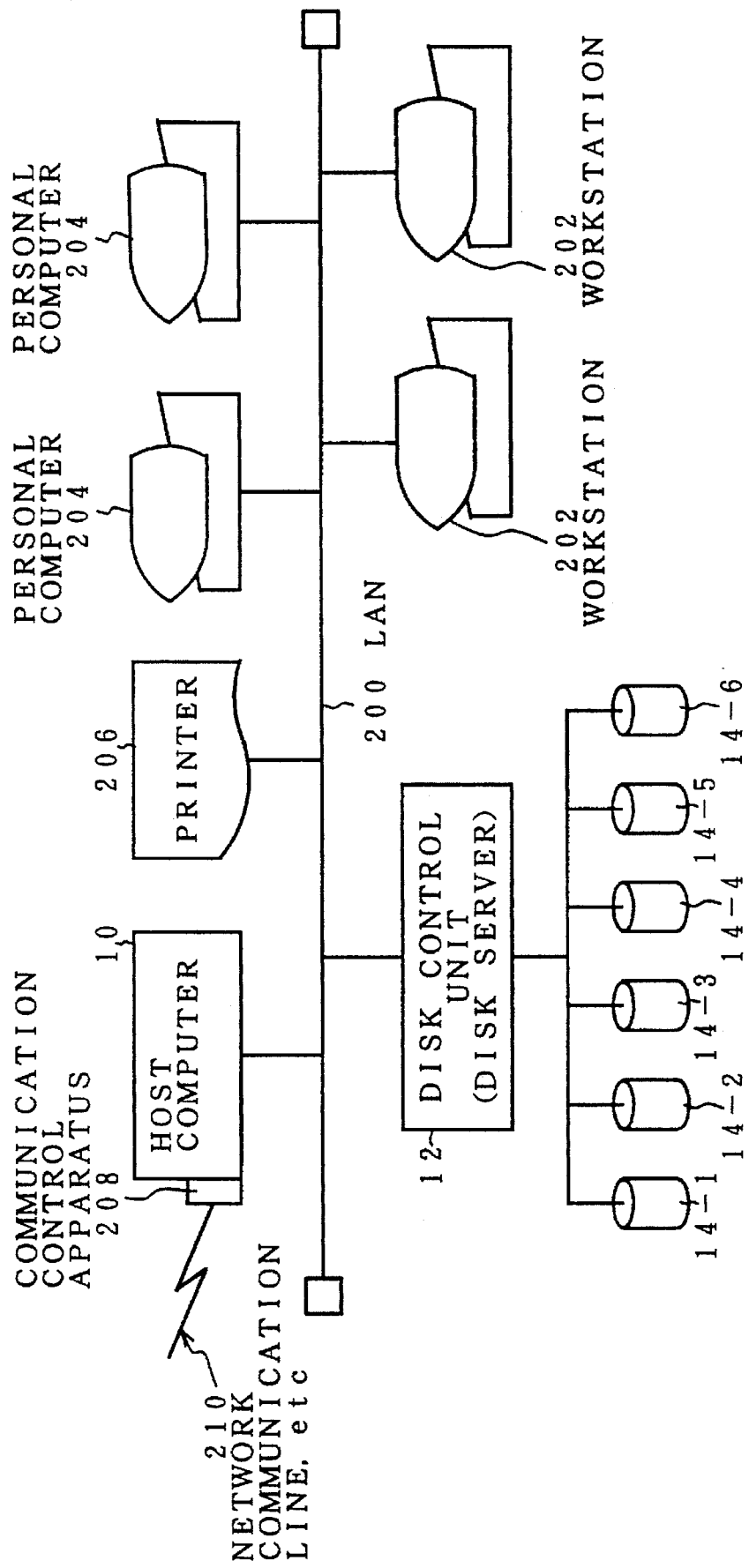

DISK CONTROL APPARATUS FOR RECORDING AND REPRODUCING COMPRESSION DATA TO PHYSICAL DEVICE OF DIRECT ACCESS TYPE

BACKGROUND OF THE INVENTION

The present invention relates to a disk control apparatus for recording and reproducing compressed data to/from a physical device such as a direct accessing apparatus or the like and, more particularly, to a disk control apparatus for recording and reproducing even compression data whose data size changes as fixed length block data to/from a physical device.

An external memory subsystem of a computer system needs a capacity which can store data such as many text files, program files, image data files, and the like in order to cope with multi-media. As an external memory subsystem, a magnetic disk subsystem using a magnetic disk drive having characteristics such as non-volatility of the recording, large capacity, high speed of data transfer, and the like is widely used. As a method of improving the capacity and reducing the costs of the magnetic disk subsystem, attention is paid to a data compression in recent years.

According to a conventional data compression, a capacity of a disk drive is increased by compressing data using software residing on a host computer. The data compression by the software results in increase in disk capacity while sacrificing CPU performance. The data compression by the software is limited to fields as in the data back-up, data conveyance, and the like in which a high access response speed of data is not required. In case of executing the data compression on the host computer side, a data amount to be stored in the disk drive is recognized by the host computer, so that a necessary memory capacity and a remaining memory capacity can be managed by the host computer in a manner similar to the case where there is no compressing process.

However, when the data compression is executed by the CPU of a disk control unit in order to reduce a load of the host computer, the data amount to be stored in the disk drive is not known until the compressing process is finished, so that the remaining memory capacity cannot be managed by the host computer and there is a problem such that it takes a time to assure a main memory, or the like.

In an ordinary host computer, data is recorded and reproduced to/from a fixed length sector of the disk drive similarly on a fixed length data block unit basis (logic block unit basis). Since compression data obtained from the fixed length logic block becomes variable length data of various sizes due to the character of the data. Therefore, in a method of recording the variable length compression data into the fixed length sector of the present disk drive, the compression data cannot be effectively stored on a disk medium, so that an effective activity ratio of the disk medium is remarkably low. That is, when the variable length compression data is recorded as a recording unit into the fixed length sector on the disk medium, a vain portion in which no data is recorded exists and the effective activity ratio of the disk often deteriorates.

Further, in the case where the compression data is read out from the disk medium by a read request from the host computer and expanded and, after that, updated, when the updated data is compressed, since the data size changes from that of the data before updating, the data cannot be always stored at the original location on the disk medium. Therefore, a number of fragmentations (vacancies) occur on the disk medium. In order to eliminate the fragmentation, a segment cleaning has to be executed from time to time. During the execution of the segment cleaning, inputting/outputting processes for the disk drive have to be stopped and the device is busy during such a period of time, so that there is a problem of a deterioration of an accessing performance.

Further, when a compression ratio is high, a difference between a logic address which is managed by the host computer and a physical address to manage the compression data on the disk medium is large. Consequently, there is a problem such that the value of the logic address which was decided in consideration of a seek performance of the disk drive is lost and an accessing performance deteriorates.

SUMMARY OF THE INVENTION

According to the invention, there is provided a disk control apparatus for compressing and expanding data and managing data by using a hardware of a disk control unit without increasing a CPU load on a host computer and without reducing an effective activity ratio of a disk drive. A data length becomes a problem after the data was compressed. That is, although data that is managed by the host computer is usually a data block of a fixed length, when the fixed length data block is compressed, the data length is changed. This is because a size of compression data is decided depending on the character of the data. In case of seeing the disk drive from the host computer, a data management in which a non-compression data block is recognized is necessary in order to hold an equivalence of data. For this purpose, the disk control apparatus needs a mapping table as a table for converting a logic block number (logic block address) managed by the host computer and a logic sector number (logic address number) which is managed by a magnetic disk drive.

The invention uses a method such that the disk control apparatus manages the variable length compression data in a form of a fixed length compression group (logic group) instead of a method such that the host computer manages the memory location of data. That is, a plurality of compression data obtained by compressing the fixed length block data is stored into a logic sector of a predetermined size, thereby using the variable length compression data as fixed length data, recording data so that a number of blank portions do not remain on the disk medium, and performing a necessary data management.

The non-compression data is managed by a logic block size of the host computer and is compressed on a logic block unit basis. A number of compression data compressed from the logic block as mentioned above are collected and selected so as to form a logic group of a size having a predetermined logic sector size, and after that, a logic sector of the disk medium is given and the data is recorded into the disk drive.

A minimum unit which can be recorded in the disk drive is determined by a physical sector size when the disk medium is initialized. The logic sector is set to a size that is integer times as large as the minimum physical sector. When the selected compression data is smaller than the logic sector size, dummy data is added, thereby obtaining the compression data of one logic sector.

In case of storing the logic sector to the disk drive, correspondence relations among a logic sector number, a logic block number of the compression data in the logic group, a compression flag, a relative position from the head logic block number, the number of sectors, and the like are registered in the mapping table. The information to be registered in the mapping table can be added as sector information to the head of the logic sector and the resultant information can be also stored into the disk drive.

The disk control apparatus refers to the mapping table by the logic block number received from the host computer and detects the position of the logic sector. In the disk control apparatus, therefore, the mapping table is the most important element. When the mapping table is out of order, the mapping table can be reconstructed by reading out the sector information added to the head of the logic sector.

When a specific logic block is updated by a write request of the host computer, the logic group in which the updated data is included is disassembled and becomes a candidate for forming a new logic group on a cache memory and is always combined into a new logic group and a storage location is also changed. The registration of the logic sector on the mapping table is also erased and the table is opened at the time of the group disassembly. Thus, a segment cleaning of the disk drive is unnecessary and occurrence of the device being busy due to the segment cleaning can be prevented.

Construction of the apparatus for this purpose is as follows. The disk drive as a physical device receives an allocation of a logic sector of a predetermined size (which is integer times as large as the minimum physical sector) and reads and writes data on a logic sector unit basis. A cache memory is provided between the host computer and the disk drive. The cache memory is divided into a non-compression cache memory for storing non-compression data on the logic block unit basis of the host computer and a compression cache memory for storing compression data on a compression group unit basis having the same size as that of the logic sector of the disk drive. In a cache table, the logic block number of the host computer is used as an index and at least an address in the cache, a compression flag indicating whether compression data or not, and an update flag indicative of the presence or absence of the updating are registered and used for management of the cache memory. A hit judging circuit judges whether data of a request block number from the host computer exists in the cache memory or not.

A compressing circuit extracts the data stored in the non-compression cache memory on a logic block unit basis and compresses the data. A size of the compression data obtained at this time varies depending on the nature of the data and is not always equal to a size which is integer times as large as the minimum physical sector, for instance, 1 kB, as a minimum access unit that is determined by an initialized format of a physical device, for example, a disk drive. When the size of the compression data compressed on a logic block unit basis of the host computer is not integer times of the minimum physical sector of the disk drive, the compressing circuit adds dummy data so that the size is equal to integer times of a minimum magnification sector. For example, when the compression data is equal to 1.5 kB, dummy data of 0.5 kB is added, thereby forming the compression block of 2.0 kB. A compression group forming unit collects the compression data of the logic block unit by the compressing circuit unit, thereby forming a compression group and storing the compression group into the compression cache memory. An expanding circuit unit extracts the data stored in the compression cache memory on a compression group unit basis, expands, and develops into the non-compression cache memory.

A free linked list manages a vacant logic sector of the disk drive. A device writing unit extracts the data stored in the compression cache memory on a compression group unit basis and writes into the logic sector in a vacant state obtained from the free linked list. The mapping table registers at least the logic sector number indicative of the storing position in the disk drive, the relative position in the logic sector, and the number of sectors by using a request block number of the host computer as an index and is used for managing the compression data of the disk drive. A device reading unit reads out the data in the disk drive on a compression group unit basis and transfers to the compression cache memory. A write cache control unit processes a write request from the host computer. A read cache control unit processes a read request from the host computer.

The processes of the write cache control unit are as follows. When a "mishit" is first judged by the hit judging unit for a write request from the host computer, a write logic block is stored into the non-compression cache memory and the end of the process is notified to the host computer. When a "hit" is judged in the non-compression cache memory by the hit judging unit for the write request from the host computer, the relevant logic block in the non-compression cache memory is updated to the write logic block from the host computer and the end of the process is notified to the host computer. In this instance, the logic sector number of the compression group to which the updated logic block belongs is erased from the mapping table and is moved to the free linked list (disassemble of the compression group). Further, when the compression data of the other logic block belonging to the erased logic group remains in the compression cache memory, it is moved to the compression group forming unit and is set to a combination candidate of a new group formation. Further, when a hit in the compression cache memory is judged by the hit judging unit for the write request from the host computer, the compression data including the hit logic block in the compression cache memory is expanded by the expanding circuit unit and is developed to the non-compression cache memory. The relevant logic block developed in the non-compression cache memory is subsequently updated to the write logic block from the host computer and the end of the process is notified to the host computer. In this case as well, the logic sector number of the compression group to which the updated logic block belongs is erased from the mapping table and is moved to the free linked list. The write cache control unit purges the data from the non-compression cache memory in accordance with an LRU. A cache table is referred to by the purged logic block number, the logic block in which an update flag has been set to the high level is taken out and compressed by the compressing circuit and the resultant block is supplied as a combination candidate to the compression group forming unit. The write cache control unit purges the compression group from the compression cache memory in accordance with the LRU. The logic sector in a vacant state is allocated by referring to the free linked list for the purged compression group and is written into the disk drive by the device writing unit. Simultaneously, the logic block number, logic sector number, relative position in the logic sector, and the number of sectors of a plurality of logic blocks belonging to the written compression group are registered in the mapping table. The candidates of compression groups to be formed by the compression group forming unit are combined in accordance with the storing order of the compression data in the buffer memory in the compressing circuit or the compressing order. One compression group can be also formed by detecting the size of compression data, forming a candidate list in which data is classified every data size, and selecting a plurality of candidates which exceed the standard size from the candidate list. In this case, one compression data group can be also formed by selecting a plurality of candidates of the same size from the candidate list in which the data has been classified every size. One compression data group can be also formed by selecting a plurality of candidates of different sizes. There occurs a case such that a total data size obtained by combining a plurality of candidates is less than a specified compression group size depending on the compression data size. In this case, one compression group is formed by storing dummy data into vacant remaining areas. The number of candidates to be combined into one compression group can be limited to a specific number by the compression group forming unit. For example, the number of candidates to be combined to one compression group is limited to two or less or four or less. Such a limitation depends on the number of parallel circuits of the compressing circuit and expanding circuit which are constructed by a hardware. For instance, when two parallel circuits each comprising the compressing circuit and expanding circuit are provided, the number of compression data in the group is limited to two, thereby enabling parallel processes to be executed and the data can be compressed or expanded at a high speed. The compression group which is used in the invention has a size which is integer times as large as the logic block of the host computer. For example, when a mean compression ratio is equal to ½, a double size is preferable. A size of $2^n$ times (where, n is integer of 1, 2, 3, 4, . . . ) as large as the logic block of the host computer can be also used. The device writing unit adds information that is registered in the mapping table to the head of the logic sector as sector information and stores the resultant data into the disk drive. In case of a failure of the mapping table, the mapping table can be reconstructed by reading out the sector information of the logic sector from the disk drive. When the compression group is written, the write cache control unit can also select the logic sector of the disk drive to be stored from the free linked list by a hashing. For example, the logic sector of the disk drive to be stored is selected from the free linked list by the hashing in the same cylinder address. Thus, a seek performance of the disk drive is raised.

Processes of the read cache control unit are as follows. When a mishit is judged by the hit judging unit for the read request from the host computer, the read cache control unit reads out the compression group of the relevant logic sector from the disk drive by referring to the mapping table by the logic block number of the read request, the relevant compression data is extracted from the read compression group, expanded by the expanding circuit, developed to the cache memory, and transferred to the host computer. The process is finished. When a hit in the non-compression cache memory is judged by the hit judging unit for the read request from the host computer, the relevant logic block is transferred from the non-compression cache memory to the host computer and the process is finished. Further, when a hit in the compression cache memory is judged by the hit judging unit for the read request from the host computer, the compression group including the relevant logic block is extracted from the compression cache memory, expanded by the expanding circuit, and developed to the non-compression cache memory. The relevant logic block in the non-compression cache memory is transferred to the host computer and the process is finished.

Further, according to the invention, a duplexed system is constructed by using two systems each comprising the cache memory, cache table, hit judging unit, compressing circuit, compression group forming unit, expanding circuit, device writing unit, mapping table, device reading unit, write cache control unit, and read cache control unit. The host computer commonly uses the two systems and the two systems commonly use the disk drive. Each of the read cache control units in the duplexed two systems independently operates for the read request from the host computer. When new data from the host computer is stored according to the mishit judgement of the self cache memory, each of the write cache control units in the duplexed two systems copies the new data into the cache memory of the other system and also updates the cache table of the other system. Even when hit data is updated to the new data from the host computer according to the hit judgement of the self cache memory, the updated data is copied to the cache memory of the other system and the cache table of the other system is also updated.

As another modification of the invention, the compression group forming unit adds a position flag indicative of the position in the group to the head position of each candidate upon forming the compression group and also registers the position flag into the mapping table when the compression group is written into the disk drive. The position flag shows either one of the head position in the group, a middle position in the group, and a middle position between the end of the group and the head of the next group. The read cache control unit expands the compressed logic block unit by using the position flag in the compression group.

A non-volatile memory is used as a cache memory. The mapping table is stored into the non-volatile memory provided as a cache memory. The disk drive is a magnetic disk drive, an optical disk drive, or a semiconductor memory device. A disk array apparatus having a plurality of disk drives can be also used as a disk drive.

According to the invention, since the disk control apparatus of the external memory subsystem executes the data compression, a load concerning the data compression of the host computer is eliminated, the capacity of the existing external memory system is increased, and a system of low costs can be realized. In the case where the fixed length data from the host computer is compressed by the disk control apparatus, although the compression data length varies depending on the nature of the data, one fixed length compression group is formed by combining a plurality of compression data and the data is recorded and reproduced to/from the disk drive on a compression group unit basis, thereby enabling the fixed length recording of the compression data as variable length data to be performed. Internal fragments of the disk drive can be minimized. Therefore, the segment cleaning of the disk drive which is necessary for storing the variable length data is unnecessary and the "device busy" due to the segment cleaning doesn't occur, so that the access performance can be improved. The "device busy" doesn't occur due to the segment cleaning.

The above and other objects, features, and advantages of the present invention will become more apparent from the following detailed description with reference to the drawings.

BRIEF DESCRIPTION OF THE DRAWINGS

FIG. 7 is an explanatory diagram of a non-compression cache memory and a compression cache memory;

FIG. 10 is an explanatory diagram of a mapping table;

FIG. 11 is an explanatory diagram of a free linked list;

FIG. 29 is an explanatory diagram of a compression group formation which doesn't need an addition of dummy data;

FIG. 34 is a block diagram of another operation environment of the invention.

DETAILED DESCRIPTION OF THE PREFERRED EMBODIMENT

[Operation environment]

Figure 1:
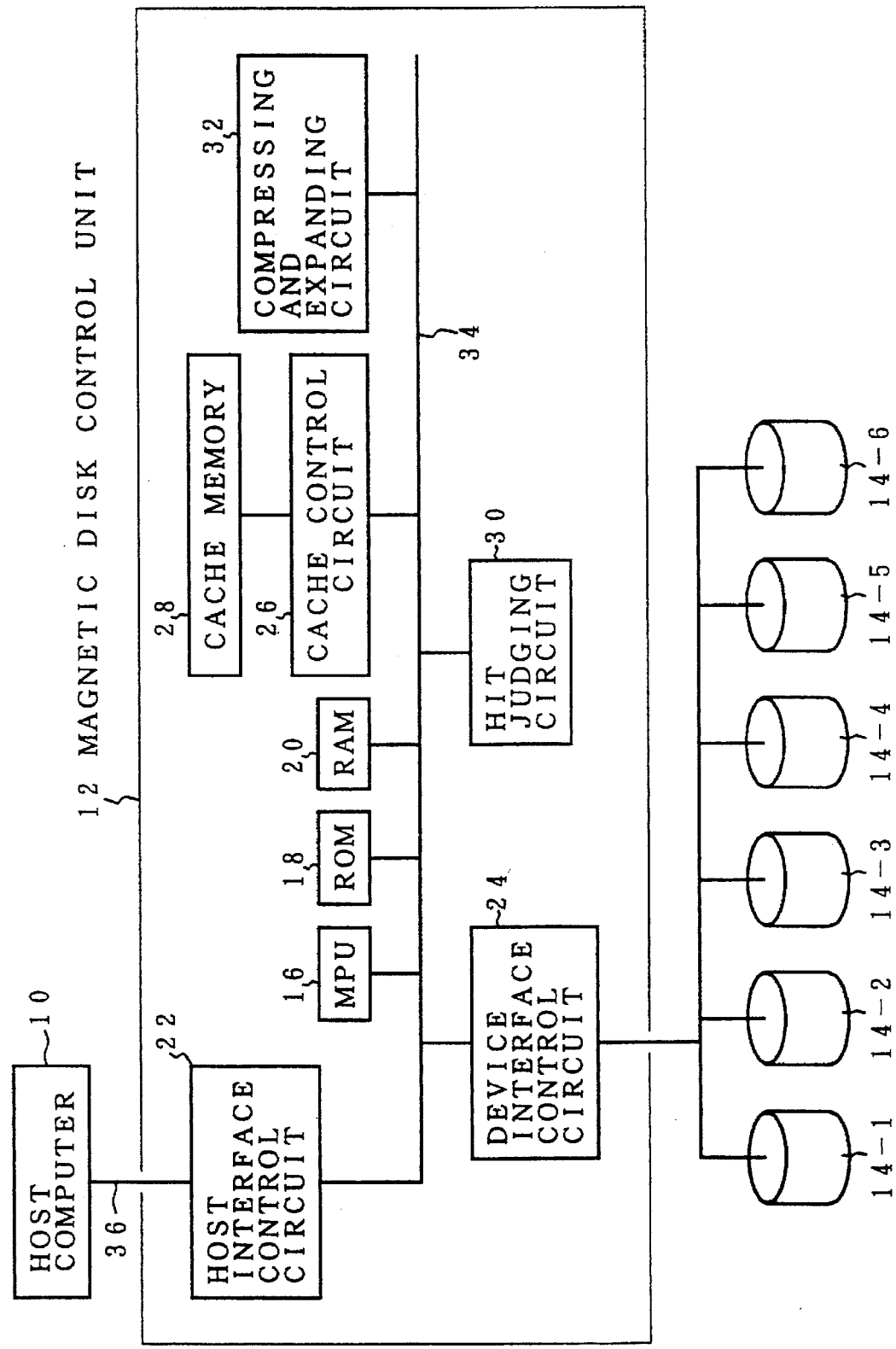
FIG. 1 is a block diagram of an operation environment to which the invention is applied.

FIG. 1 is a block diagram of an operation environment in which a compression data memory system of the invention is embodied. For a host computer 10, a subsystem for external storage is constructed by a magnetic disk control unit 12 and a disk array having a plurality of disk drives 14-1 to 14-6. An MPU 16, an ROM 18, an RAM 20, a host interface (I/F) control circuit 22, a disk interface (I/F) control circuit 24, a cache control circuit 26, a cache memory 28, a hit judging circuit 30, and a compressing and expanding circuit 32 are provided for the magnetic disk control unit 12 and are connected to the MPU 16 by an internal bus 34, respectively. The MPU 16 controls the whole magnetic disk control unit 12 by a program provided in the ROM 18. Particularly, in the present invention, the compressing and expanding circuit 32 is provided for the magnetic disk control unit 12 and executes a control for data compression and reconstruction such that data from a host computer 36 is compressed by the compressing and expanding circuit 32 and is stored into the disk drives 14-1 to 14-6 and, on the other hand, the compression data read out from the disk drives 14-1 to 14-6 is expanded and transferred to the host computer 10. Further, the MPU 16 also performs a control such that after the data transmitted on a logic block unit basis from the host computer 10 was compressed, it is combined into a predetermined logic sector to thereby form a compression group, and the compression groups are written into the disk drives 14-1 to 14-6. The host I/F control circuit 22 and disk I/F control circuit 24 presume, for example, the SCSI. The cache memory 28 temporarily holds the data that is transferred between the host computer 10 and the disk drives 14-1 to 14-6 as physical devices. The cache memory 28 also temporarily holds the compression data combined into the compression group. The compression data compressed on a logic block unit basis of the host computer 10 by the compressing and expanding circuit 32 is combined into a compression group of a predetermined size in the cache memory 28. After that, the compression data is stored into the disk drives 14-1 to 14-6 as physical devices. As will be obviously explained hereinlater, the compressing and expanding circuit 32 has a buffer memory therein and compresses and expands the data transferred into the buffer memory. A data transmission between the buffer memory built in the compressing and expanding circuit 32 and the cache memory 28 is controlled by the MPU 16.

The magnetic disk control unit 12 recognizes a plurality of disk drives 14-1 to 14-6 which are physically connected as one logic disk. The compression data is combined and stored in the logic disk on a compression group unit basis. Now, assuming that the total disk capacity of the disk drives 14-1 to 14-6 is set to 1 GB, a capacity of the logic disk which is recognized by the magnetic disk control unit 12 is equal to 1 GB. However, now assuming that the disk capacity is doubled due to the data compression, the capacity of the logic disk is expanded to 2 GB and is handled. Further, a minimum sector unit at which the disk drives 14-1 to 14-6 can be accessed has been determined by a format of an initializing process and, for example, the minimum physical sector is set to 1 kB. In the following description, accordingly, it is assumed that a size of logic block which is handled by the host computer 10 is set to 4 kB and the compressing and expanding circuit 32 compresses and expands the logic block size of 4 kB as one unit. A size of compression group (also referred to as a compression cluster) in which a plurality of compression data derived by the compression of the logic block unit is collected is set to 16 kB, which is four times as large as that of the logic block.

Figure 2:
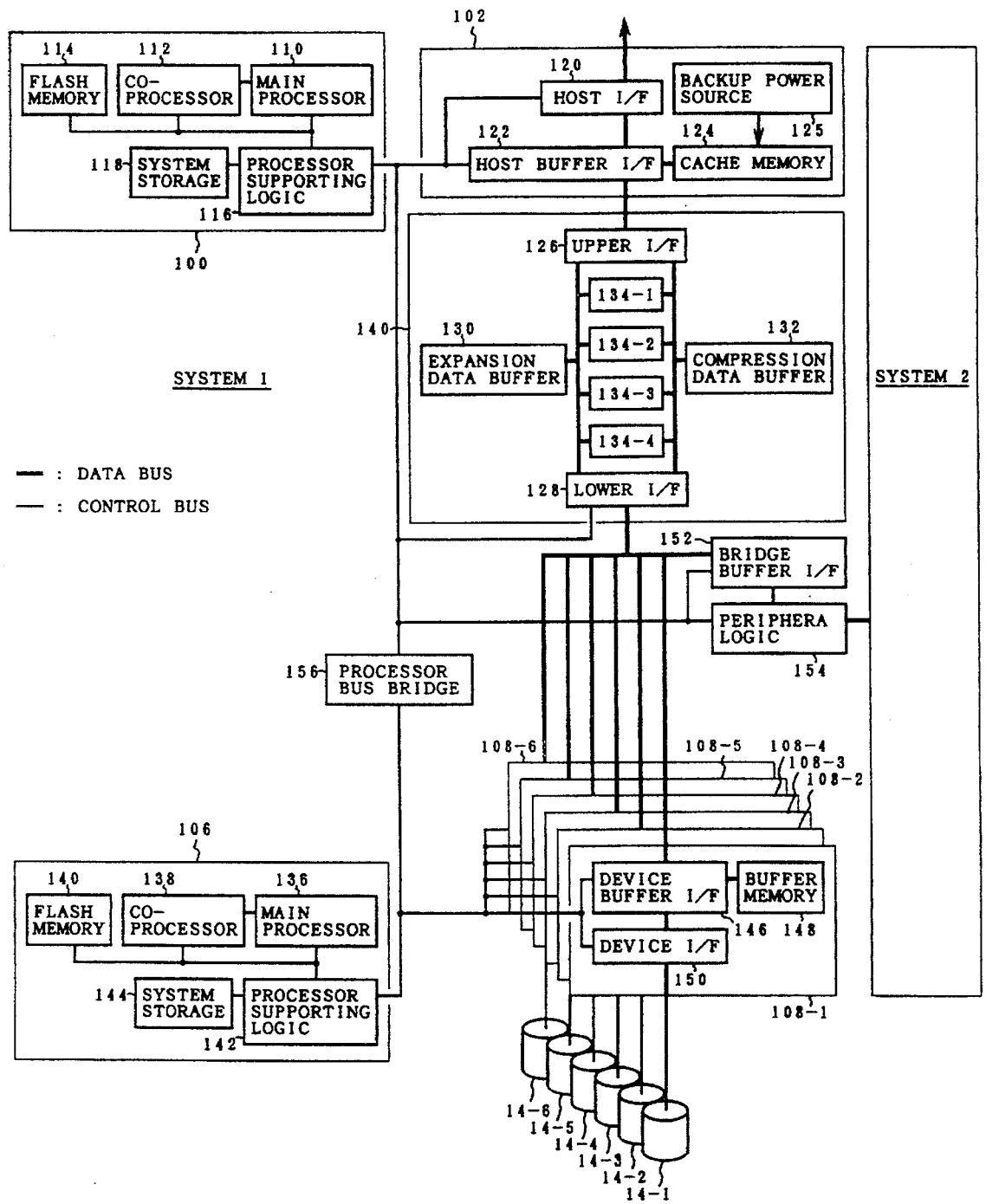
FIG. 2 is a block diagram of a hardware construction which realizes a system of FIG. 1.

FIG. 2 shows a case where the invention is applied to an RAID controller as a specific example of the operation environment of FIG. 1. The RAID controller is constructed by: a processor module 100 for a host interface; a host interface module 102; a processor module 106 for a device interface; and device interface modules 108-1 to 108-6. In the invention, a data compressing and expanding module 104 is further added to such an ordinary RAID controller. The processor module 100 for the host I/F is constructed by a main processor 110, a co-processor (abbreviation of cooperated processor) 112, a flash memory 114, a processor supporting logic 116, and a system storage 118. This construction shall also apply to the processor module 106 for the device I/F. The processor module 106 is constructed by a main processor 136, a co-processor 138, a flash memory 140, a processor supporting logic 142, and a system storage 144. The processor module 100 for the host I/F and processor module 106 for the device I/F are connected by a control bus through a processor bus bridge 156. The host I/F module 102 has a host interface 120, a host buffer interface 122, and a cache memory 124. A backup power source 125 is provided for the cache memory 124 and constructs a nonvolatile cache memory. As for the device interface modules 108-1 to 108-6, as representatively shown in the device I/F module 108-1, the module 108-1 has a device buffer interface 146, a buffer memory 148, and a device interface 150. The data compressing and expanding module 104 newly added to the RAID controller as mentioned above has an upper interface 126, a lower interface 128, a buffer memory 130 for storing expansion data, a buffer memory 132 for storing compression data, and four compressing and expanding logics 134-1 to 134-4.

Figure 3:
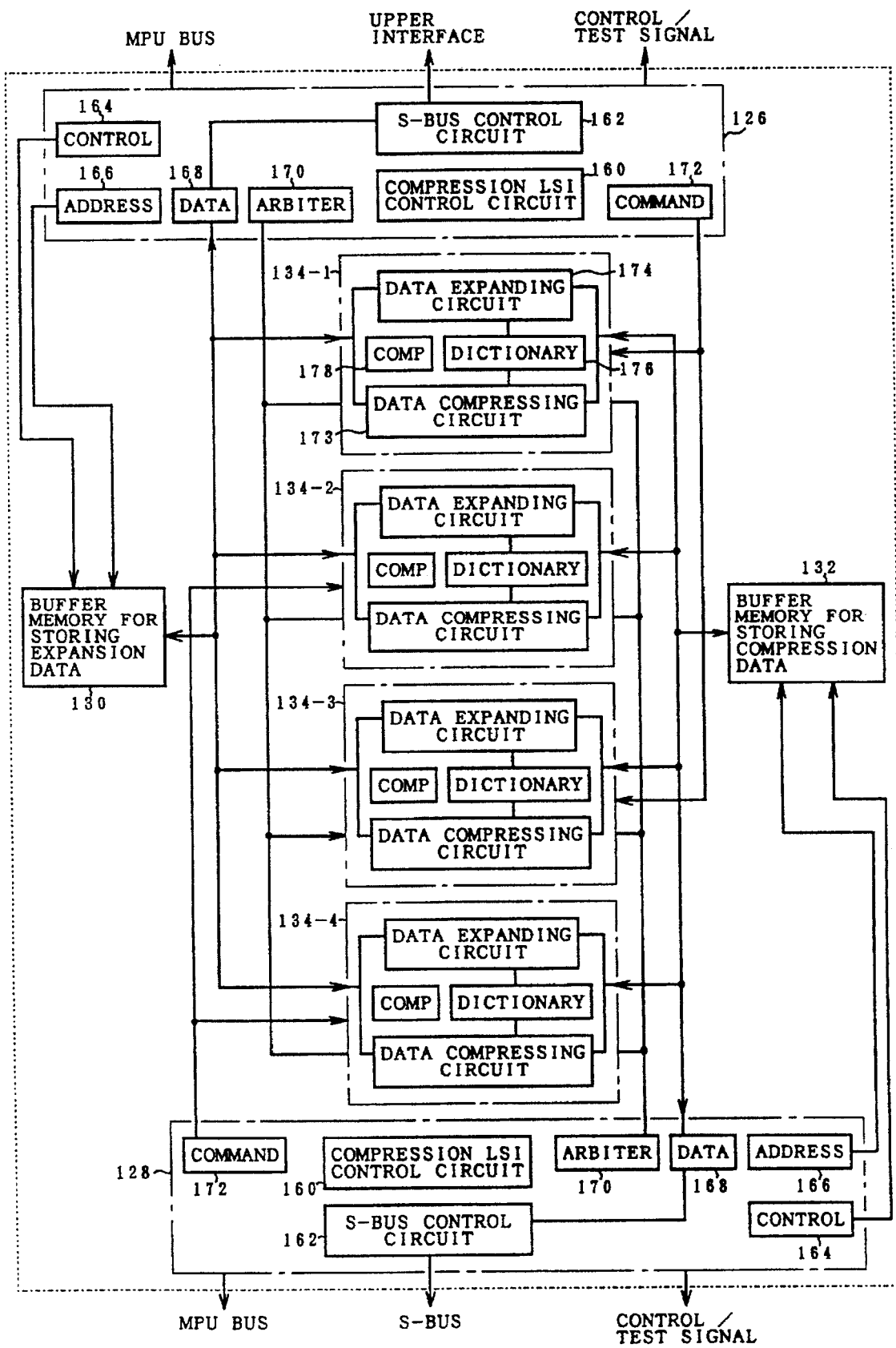
FIG. 3 is a detailed block diagram of a compressing module in FIG. 2.

FIG. 3 shows the details of the data compressing and expanding module 104 in FIG. 2. The upper interface 126 is provided for connection with an internal bus on the host side. The lower interface 128 is used for connection with an interface on the device side. The upper interface 126 is provided with a compression LSI control circuit 160, a system bus control circuit 162, a control register 164, an address register 166, a data register 168, an arbiter 170, and a command register 172. This internal construction shall also apply to the lower interface 128. As for the compressing and expanding logics 134-1 to 134-4, as representatively shown in the compressing and expanding logic 134-1, the logic 134-1 has a data compressing circuit 173, a data expanding circuit 174, a dictionary memory 176, and a comparing circuit 178. As a compressing algorithm which is realized by the compressing and expanding logics 134-1 to 134-4, a proper algorithm such as arithmetic encoding algorithm AZ (algorithm), LZW algorithm, or the like can be applied. Particularly, in the embodiment of FIG. 3, since the compressing and expanding logics 134-1 to 134-4 of four circuits are provided, up to four parallel compressing or expanding processes can be executed. In the invention, the data which was swept out from the cache memory is stored into the buffer memory 130 for storing the expansion data and, after that, the data is compressed and stored into the buffer memory 132 for storing the compression data. The compression data storing buffer memory 132 forms a compression group (compression cluster) of, for example, 16 kB by collecting a plurality of compression data. The formation of the compression group using a plurality of compression data will be obviously explained hereinlater. When a plurality of compression data are combined and the compression group is formed in the compression data storing buffer memory 132, the compression group is returned to the cache memory. After that, the compression group is stored into a disk drive of an array construction forming a logic disk.

Referring again to FIG. 2, in the RAID controller, now assuming that the module side shown in the diagram is set to a system 1, by providing a system 2 with a similar module construction, a duplexed construction is realized. The systems 1 and 2 are coupled by a data bus through bridge buffer interface 152 and a peripheral logic 154. Therefore, data and various commands are transmitted and received between the systems 1 and 2.

[Functional construction]

Figure 4:
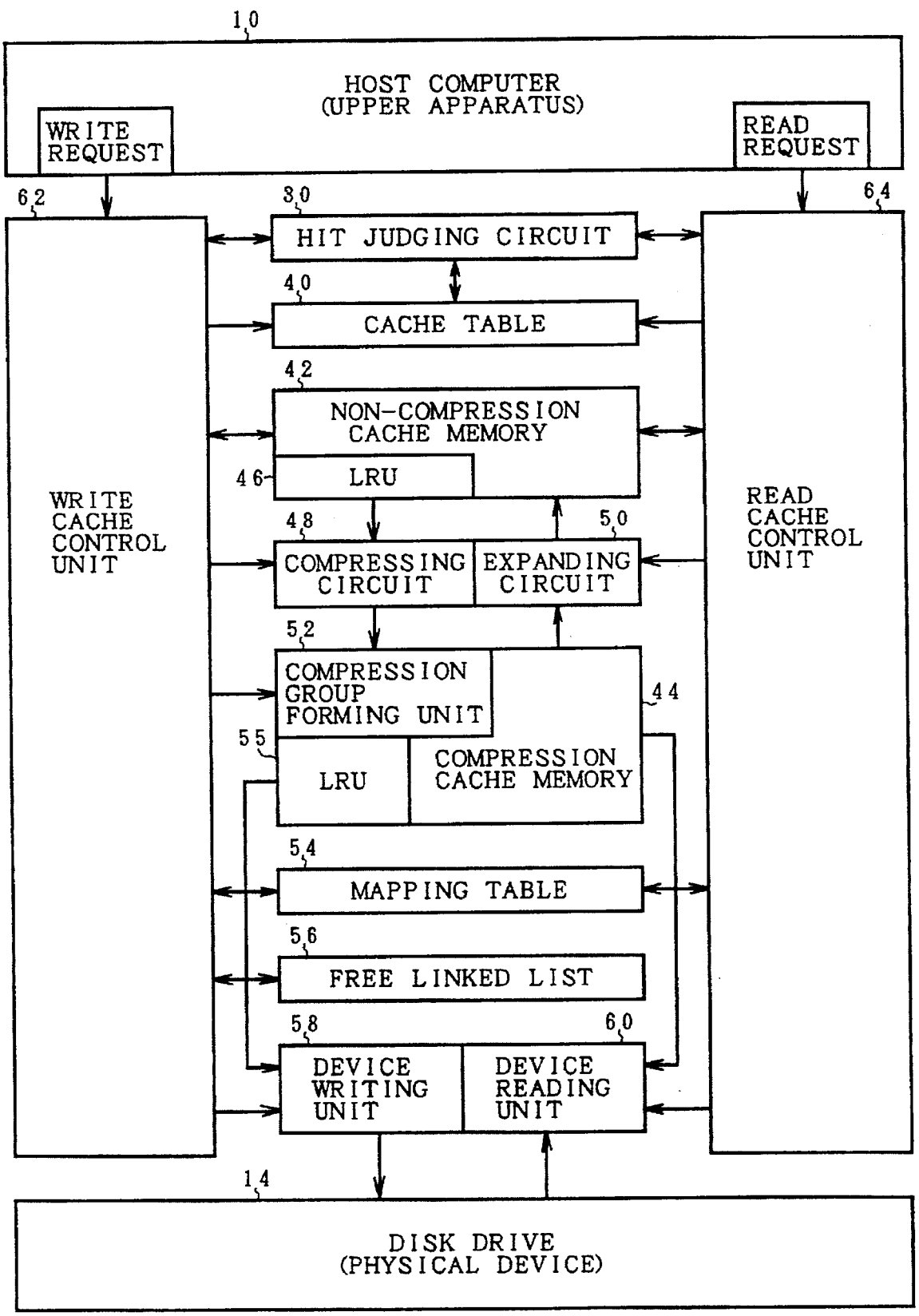
FIG. 4 is a functional block diagram of the invention.

FIG. 4 is a functional block diagram of the magnetic disk control unit 12 in FIG. 1. When the magnetic disk control unit 12 of the invention is seen as functions, it has the hit judging circuit 30, a cache table 40, a non-compression cache memory 42, a compression cache memory 44, a compressing circuit 48, an expanding circuit 50, a compression group forming unit 52, a mapping table 54, a free linked list 56, a device writing unit 58, a device reading unit 60, a write cache control unit 62, and a read cache control unit 64. Further, an LRU unit 46 is provided for the non-compression cache memory 42 in order to realize a cache function. Similarly, an LRU unit 55 is provided for the compression cache memory 44.

Figures 5, 6:
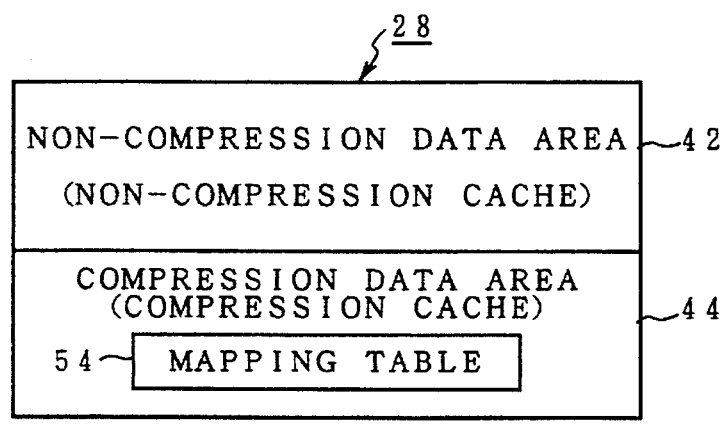
FIG. 5 is an explanatory diagram of a cache memory.
FIG. 6 is an explanatory diagram of a cache table.

FIG. 5 shows the cache memory 28 in FIG. 1. The cache memory 28 is divided into a non-compression data area 42 and a compression data area 44. In the functional block of FIG. 4, the non-compression data area 42 is set to the non-compression cache memory 42 and the compression data area 44 is set to the compression cache memory 44. The cache memory 28 is a non-volatile memory since it has the backup power source 125 as shown in the hardware construction of FIG. 2. Further, the mapping table 54 is stored in the cache memory 28 as a non-volatile memory. In the non-compression data area 42 in the cache memory 28, a logic block size of 4 kB as a processing unit of the host computer 10 is set to a cache block (cache segment) and the data is managed. On the other hand, with respect to the compression data area 44, the cache blocks (cache segments) are managed on a compression group unit basis of 16 kB. The contents of the cache memory 28 are stored in the cache table 40.

FIG. 6 shows the cache table 40 of the invention. Table information is formed in the cache table 40 every logic block number 40-1 which is handled by the host computer. In correspondence to the logic block number 40-1, an address 40-2 in the cache indicative of a storing position, a data length 40-3, a compression flag 40-4 indicating whether the data is compression data or not, and an updating flag 40-3 indicating whether the data has been updated (rewritten) on the cache or not are registered. Therefore, for a write request or a read request in which the logic block number is designated and which is transmitted from the host computer 10, the hit judging circuit 30 can judge whether a mishit or a hit has occurred in the cache on the basis of the presence or absence of the registered logic block number 40-1 with reference to the cache table 40 in FIG. 6. When the hit occurs, the address 40-2 in the cache, data length 40-3, the compression data (when the compression flag 40-4 is set) or non-compression data (when the compression flag 40-4 is reset), and the updating result regarding whether the data has been updated (when the updating flag 40-5 is set) or not (when the updating flag 40-5 is reset) can be known from the table data corresponding to the relevant logic block number 40-1.

FIG. 7 shows the transmission and reception of the non-compression data and compression data in the cache memory by the compressing circuit 48 in FIG. 4. First, in the non-compression cache memory 42, the data is managed by cache blocks 68-1 to 68-n each having a size of 4 kB which coincides with the logic block size of the host computer 10. It is now assumed that data of logic block numbers #a, #b, c, and #d has been stored in the non-compression cache memory 42. When the logic block numbers #a, #b, #c, and #d are swept out from the non-compression cache memory 42 by the LRU, the compressing circuit 48 compresses each of the cache blocks 68-1 to 68-4, thereby forming compression data. The compression cache memory 44 is managed on a compression group (compression cluster) unit basis having a size of 16 kB, that is four times as large as that of each of the cache blocks 68-1 to 68-n of 4 kB. Therefore, compression data 72-1 to 72-4 of the cache blocks 68-1 to 68-4 of the logic block numbers #a to #d are combined to one data block as shown in, for example, a compression group 70-n.

Figure 8A:
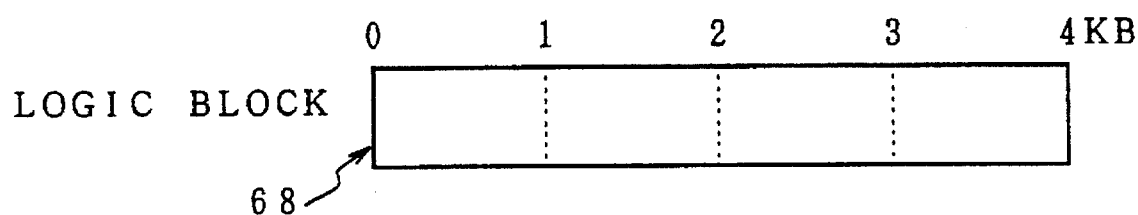
FIGS. 8A and 8B are explanatory diagrams of compression data of 4 kB.
Figure 8B:
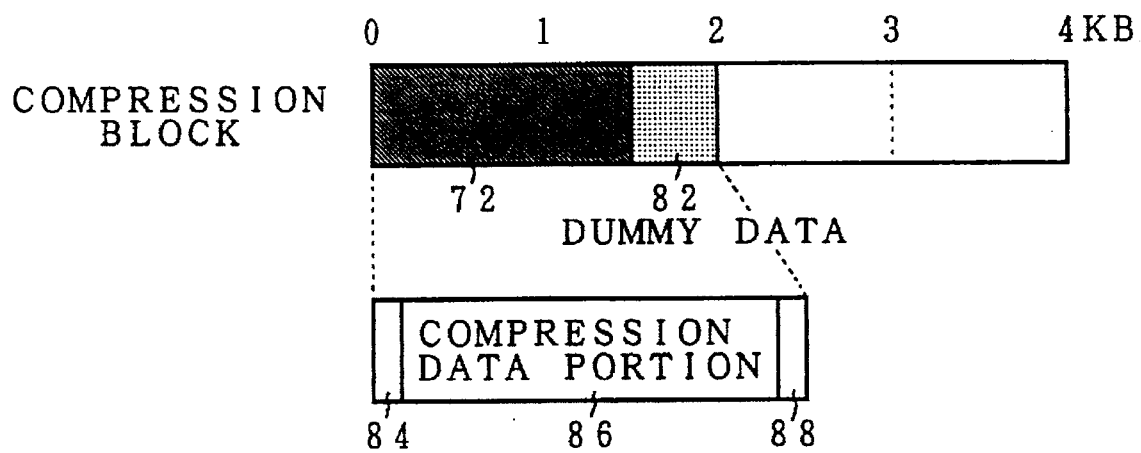

FIGS. 8A and 8B show the compression data of the logic block of 4 kB according to the compressing circuit 48. It is now assumed that a logic block 68 of 4 kB in FIG. 8A is compressed by the compressing circuit 48 and compression data 72 in FIG. 8B is obtained. It is now assumed that the compression data has, for example, 1.5 kB. In the disk drives 14-1 to 14-6 as physical devices of the invention, a size of minimum physical sector which can be accessed is determined to be, for example, 1 kB according to the format upon initialization. Therefore, in case of the compression data 72 of 1.5 kB itself, the minimum physical sector cannot be stored into the disk drive of 1 kB. Accordingly, dummy data 82 of 0.5 kB is added after the compression data 72, thereby forming compression block of 2 kB. Thus, the compression block has at least a size of 1 kB that is equal to the minimum physical sector of the disk drive. As mentioned above, as extracted and shown on the lower side, the compression block added with the dummy data 82 as necessary has the inherent compression data and a compression data portion 86 including the dummy data provided as necessary subsequent to a start code 84, and an end code 88 is provided at the end. By forming such a compression block, the compressing circuit 48 and expanding circuit 50 can perform a grouping operation due to a combination of the compression blocks corresponding to the logic block numbers each having a size that is integer times as large as the minimum physical sector and an extraction of the necessary compression blocks from the group.

Figure 9:
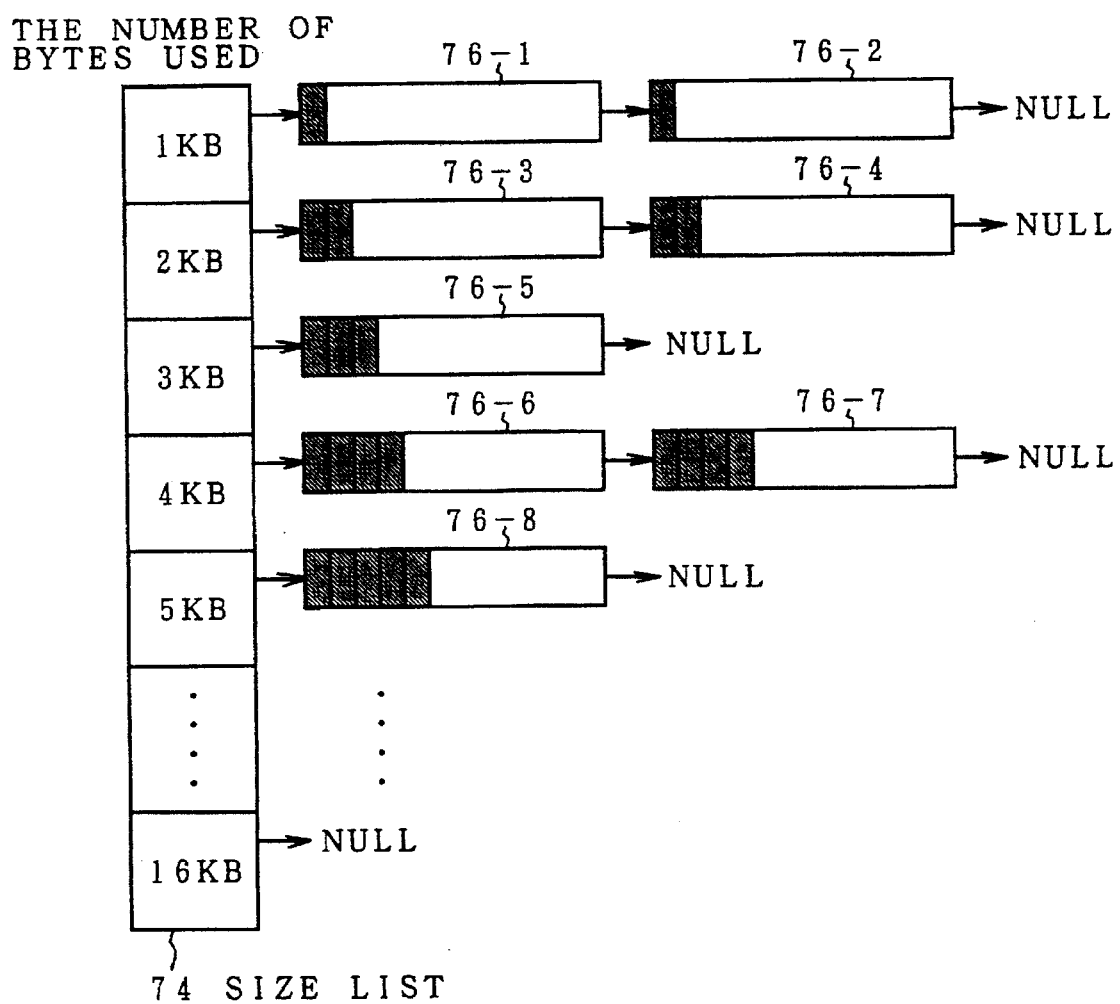
FIG. 9 is an explanatory diagram of a candidate list of compression groups.

Processes of the compression group forming unit 52 in FIG. 4 will now be described. FIG. 9 shows an example of the process for forming a compression group from the compression blocks derived by the compression of the logic block unit. In the formation of the compression group, when the logic block is compressed by the compressing circuit 48, the size of compression block formed is detected. Therefore, as a size list 74, the number of bytes within a range from 1 kB to 16 kB which are used in the compression block are prepared and a candidate list to combine the compression group in which the compression blocks are classified every size is formed. In case of FIG. 9, compression blocks 76-1 and 76-2 are linked as a combination candidate in 1 kB of the number of bytes which are used. Similarly, compression blocks 76-3 to 76-8 separated to the same size are linked by a list structure in 2 kB to 5 kB of the numbers of bytes used, respectively. There are the two following methods of forming the compression group by using the size list 74.

I. The compression blocks of the same size are combined.
II. The compression blocks of different sizes are combined.

For example, according to the method I, when sixteen candidates of the compression blocks of 1 kB of the number of bytes used are formed, they are collected and one compression group is formed. When the number of bytes used is set to 2 kB, it is sufficient to collect eight compression blocks. On the other hand, according to the method II, the compression group of 16 kB can be also formed by combining the compression blocks of different sizes. In this case, two or more compression blocks of the same size can be also used. As another method of forming the compression group, it is also possible to form the compression group of the size of 16 kB in accordance with the order of the storage addresses for the buffer memory (compression data storing buffer memory 132 in FIG. 3) which the compressing circuit 48 has. As still another method, the compression group of 16 kB can be also formed in accordance with the time-dependent compressing order by the compressing circuit 48. When the compression group of 16 kB by the combination of a plurality of compression blocks is formed, as shown in the compression group 70-n in FIG. 7, it is desirable to form 16 kB without causing a remainder by combining the four compression blocks 72-1 to 72-4. However, in the case where the number of bytes used doesn't reach 16 kB by the combination of the candidate blocks, it is also possible to form the compression group of 16 kB by adding dummy data (NULL) into a vacant area. To raise an effective using efficiency of the disk drive, it is desirable to form a compression group so as not to cause a vacant area as much as possible.

The compression groups formed by the compression group forming unit 52 are stored into the compression cache memory 44 as shown in FIG. 7. When a capacity used in the compression cache memory 44 reaches a specified value, the compression groups stored in the compression cache memory 44 are swept out by the LRU unit 55 and is written back to a disk drive 14 as a physical device. When the compression groups are written back to the disk drive 14, vacant logic sectors are sequentially allocated in accordance with the order from the head of the list with reference to the free linked list 56 indicative of vacant states of the logic sectors of the disk drive 14 and the compression groups are stored into the allocated logic sectors. A correspondence relation between the logic block number of each compression block included in the compression group and the logic sector number as a storage destination is registered into the mapping table 54.

FIG. 10 shows the mapping table 54 of the present invention. A logic sector number 54-2 of the disk drive 14 as a storage destination of the compression group in which the compression blocks are combined, the number of offset sectors 54-3 indicative of the relative position from the head of the compression group to the relevant compression block, and a sector length 54-4 indicative of the size of compression block have been stored in the mapping table 54 in correspondence to a logic block number 54-1 which is handled by the host computer 10. Therefore, when the magnetic disk control unit 12, specifically speaking, the write cache control unit 62 or read cache control unit 64 in FIG. 4 extracts the necessary data from the disk drive 14 by using the logic block number notified from the host computer 10, it is possible to access by obtaining the logic sector number 54-2 from the mapping table 54. When the compression block of the necessary logic block number is extracted from the compression group which was read out from the disk drive 14 and developed in the compression cache memory 44, the position from the head of the group is known by the number of offset sectors 54-3 in the mapping table 54, the compression blocks corresponding to the sector length 54-4 are extracted and are expanded by the expanding circuit 50, and the expanded logic blocks can be developed in the non-compression cache memory 42.

FIG. 11 shows a free linked list which is used for allocation of the logic sectors to the logic groups. The free linked list 56 has a link structure in which empty logic sectors 56-1, 56-2, and 56-3 in a logic sector table 66 are coupled by address information. An address of the empty logic sector 56-1 in the free linked list is managed as a head address by the MPU 16. For the head address, an address of the next empty logic sector 56-2 is stored into the head empty logic sector 56-1 in the logic sector table 66. In a manner similar to the above, addresses of the subsequent logic sectors are sequentially stored. Therefore, when writing back to the compression cache memory 44, the MPU 16 allocates the empty logic sector 56-1 having the head address in the free linked list 56 to the compression group which was swept out, thereby performing the storage into the disk drive 14 and the formation of the mapping table 54.

Figure 12:
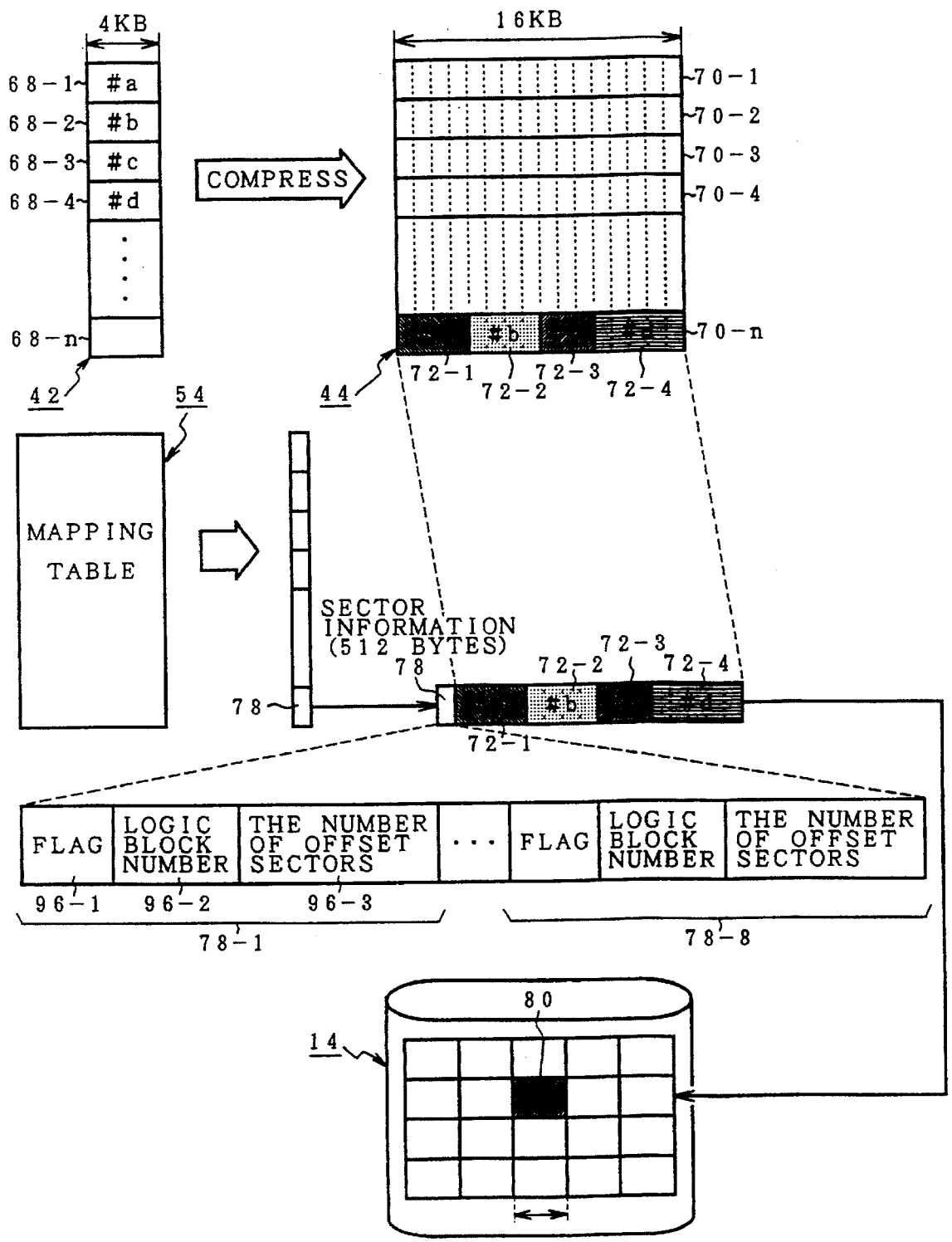
FIG. 12 is an explanatory diagram of a flow from a compression to a disk storage.

FIG. 12 shows a flow of processes which are executed until the storage from the non-compression cache memory 42 to the disk drive 14. The non-compression cache memory 42 is managed on a cache block unit basis of 4 kB. When the cache capacity reaches a specified value, the cache blocks are swept out by the LRU and are compressed on a logic block unit basis and are converted to compression groups 70-1 to 70-n of 16 kB on the non-compression cache memory 42. With respect to the compression cache memory 44, when the cache capacity reaches the specified value, the compression blocks are swept out by the LRU and are stored into the disk drive 14. At this time, for example, the compression group 70-n comprising the combination of the four compression blocks 72-1 to 72-4 which were swept out from the compression cache memory 44 can be also stored as it is into a logic sector 80 allocated from the free linked list 56 of the disk drive 14. Further, it is desirable that sector information 78 is formed from the mapping table 54 and the sector information 78 is added to the head of the compression group 70-n and the resultant data is stored into the logic sector 80 of the disk drive 14. The sector information 78 at the head of the compression group 70-n to be stored in the logic sector 80 of the disk drive 14 is constructed by four sector information 78-1 to 78-4 regarding the four compression blocks 72-1 to 72-4 constructing the group. For example, the sector information 78-1 of the compression block 72-1 is constructed by a flag 96-1, a logic block number 96-2, and the number of offset sectors 96-3. The flag 96-1 indicates whether the sector information is valid or not. When the flag 96-1 is set, the sector information is valid. The logic block number 96-2 is a logic block number of the compression block 72-1 shown by the sector information 78-1. The number of offset sectors 96-3 is the number of sectors indicative of the relative position from the head of the compression group 70-n to the compression block. As mentioned above, the logic block number of each compression block included in the group and the number of offset sectors indicative of the position in the group are included at the head of the compression group to be stored into the disk drive 14, so that even if the mapping table 54 provided for the cache memory fails, by reading out the sector information of the disk drive 14, the mapping table 54 can be reconstructed. Now, assuming that up to eight sector information 78 can be stored into the compression group 70-n, there are 64 bytes per compression block and an area of a fixed length of 512 bytes as a whole is set.

[Writing process of data]

The writing process of data in the magnetic disk control unit 12 of the invention is mainly classified into the following three cases.

I. Case where the data doesn't exist in the cache memory and the data exists in the disk drive 14.

II. Case where the data exists in the non-compression cache memory 42.

III. Case where the data exists in the compression cache memory 44.

The processing operation of the magnetic disk control unit 12 will now be described with respect to each of the cases I to III.

Figure 13:
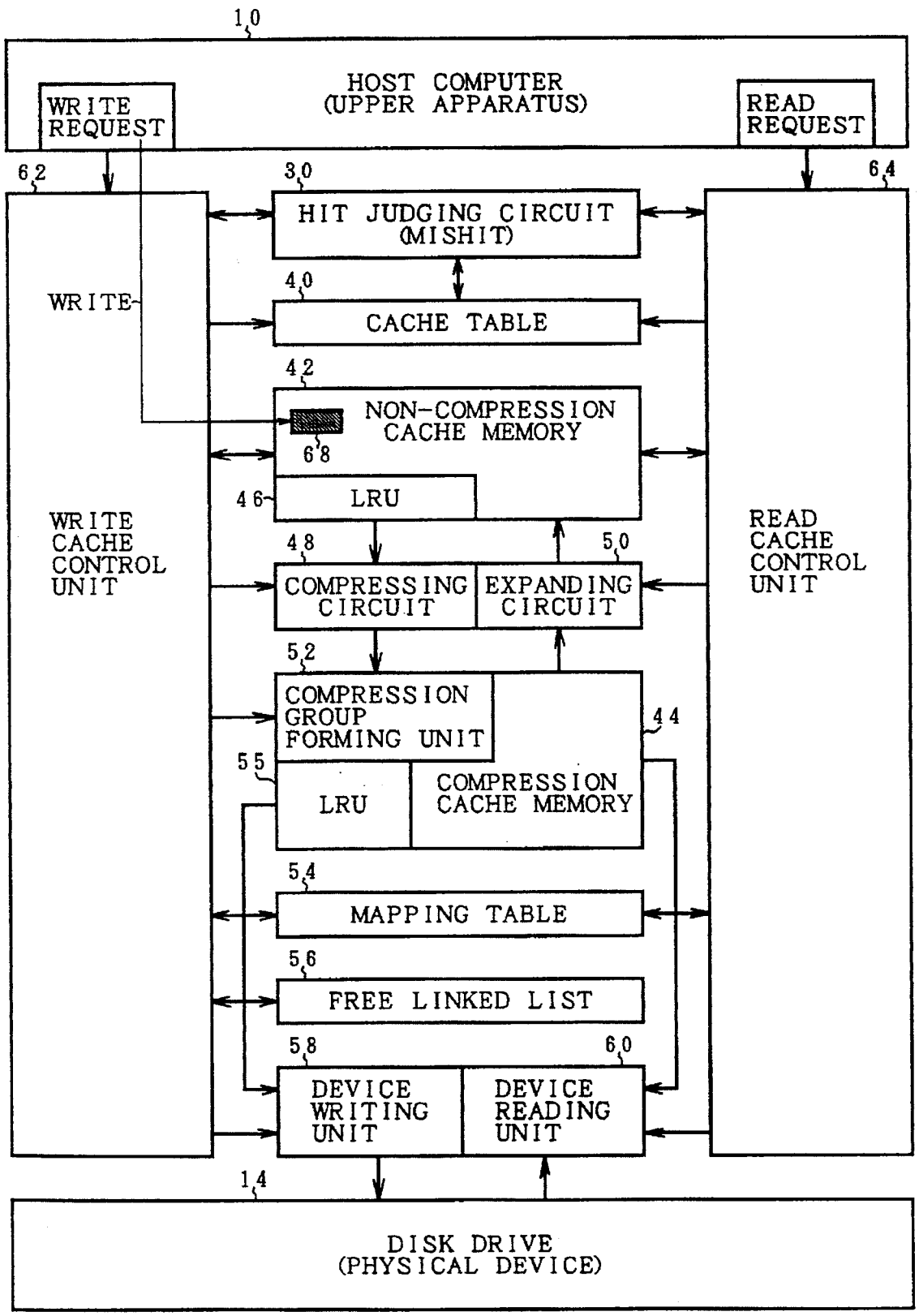
FIG. 13 is an explanatory diagram of a writing process at the time of a mishit.

FIG. 13 relates to the processes in the case where the data corresponding to the logic block number requested by the host computer 10 doesn't exist in the cache memory, namely, the case where the data doesn't exist in the non-compression cache memory 42 and compression cache memory 44. First, the write request using the logic block number is performed from the host computer 10 to the write cache control unit 62. The write cache control unit 62 requests the hit judging circuit 30 to judge about the occurrence of a hit. The hit judging circuit 30 refers to the cache table 40 by using the logic block number from the host computer 10. In this case, a mishit occurs because the logic block number as a target of the write request doesn't exist in the non-compression cache memory 42 and compression cache memory 44. The write cache control unit 62 which received the judgment result of the mishit from the hit judging circuit 30 obtains the address in the cache by a predetermined hashing with respect to the write logic block from the host computer 10, stores the address into the non-compression cache memory 42 as a cache block 68, and notifies a device end to the host computer 10. Simultaneously with the storage into the non-compression cache memory 42, the address 40-2 and data length 40-3 in the cache corresponding to the logic block number 40-1 as shown in FIG. 6 are registered into the cache table 40. In this case, since the data is the non-compression data, the compression flag 40-4 is reset to OFF and the updating flag 40-5 is also reset to OFF because of the storage of the new data.

Figure 14:
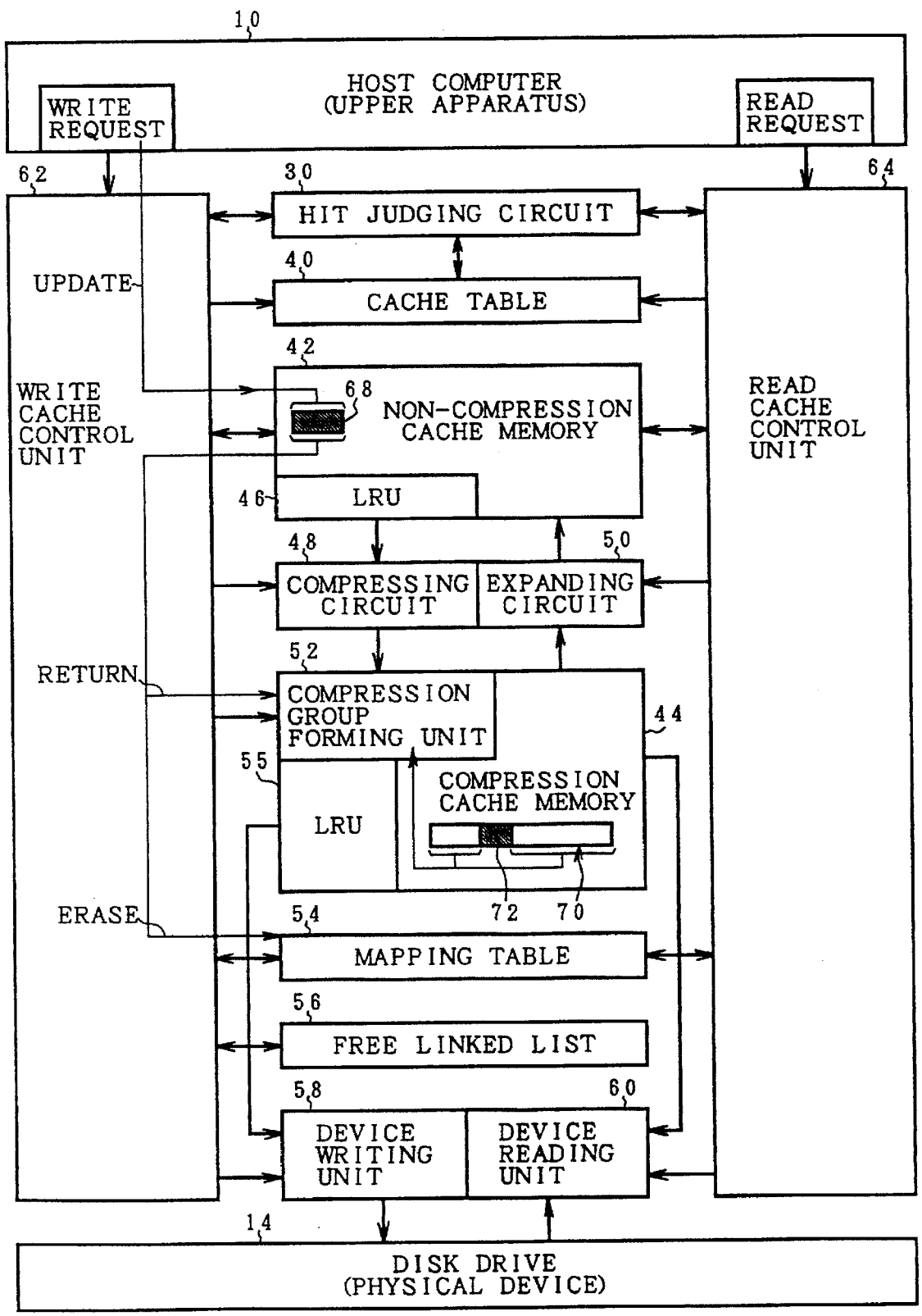
FIG. 14 is an explanatory diagram of a writing process when a hit occurs in a non-compression cache.

FIG. 14 shows the processing operation in the case where the data exists in the non-compression cache memory 42. The write cache control unit 62 which received the write request in which the logic block number was designated and which is sent from the host computer 10 requests the hit judging circuit 30 to execute a judging process. The hit judging circuit 30 searches the relevant logic block number with reference to the cache table 40 and judges the occurrence of a hit indicating that the data exists in the non-compression cache memory 42 because the compression flag is reset to OFF. In response to the hit judgment, the write cache control unit 62 updates the cache block 68 in the non-compression cache memory 42 specified by the hit judgment by using the write logic block from the host computer 10. When the updating of the cache block 68 is finished, the updating flag 40-5 (refer to FIG. 6) in the cache table 40 is checked. If the updating flag is reset to OFF, the updating flag is set to ON. When the updating flag is ON, since a compression group 70 used for development by the expanding circuit 50 of the updated cache block 68 exists in the compression cache memory 44, the compression group 70 has to be again constructed by the updating of the cache block 68. For this purpose, the logic sector number allocated to the compression group 70 including the updated cache block 68 is erased from the mapping table 54. Specifically speaking, all of the logic block numbers corresponding to the compression blocks constructing the compression group 70 are deleted from the mapping table 54. The compression blocks constructing the compression group 70 other than the updated cache block 68 are returned to the compression group forming unit 52 and are added to the candidate list to form a new compression group. As mentioned above, when the expansion blocks of the specific compression blocks constructing the compression group are updated, the compression group is dispersed. With respect to the compression blocks other than the target to be updated, by again returning them to the candidates to form a compression group, a compression group of an exactly new combination is formed and stored into the disk drive 14.

Figure 15:
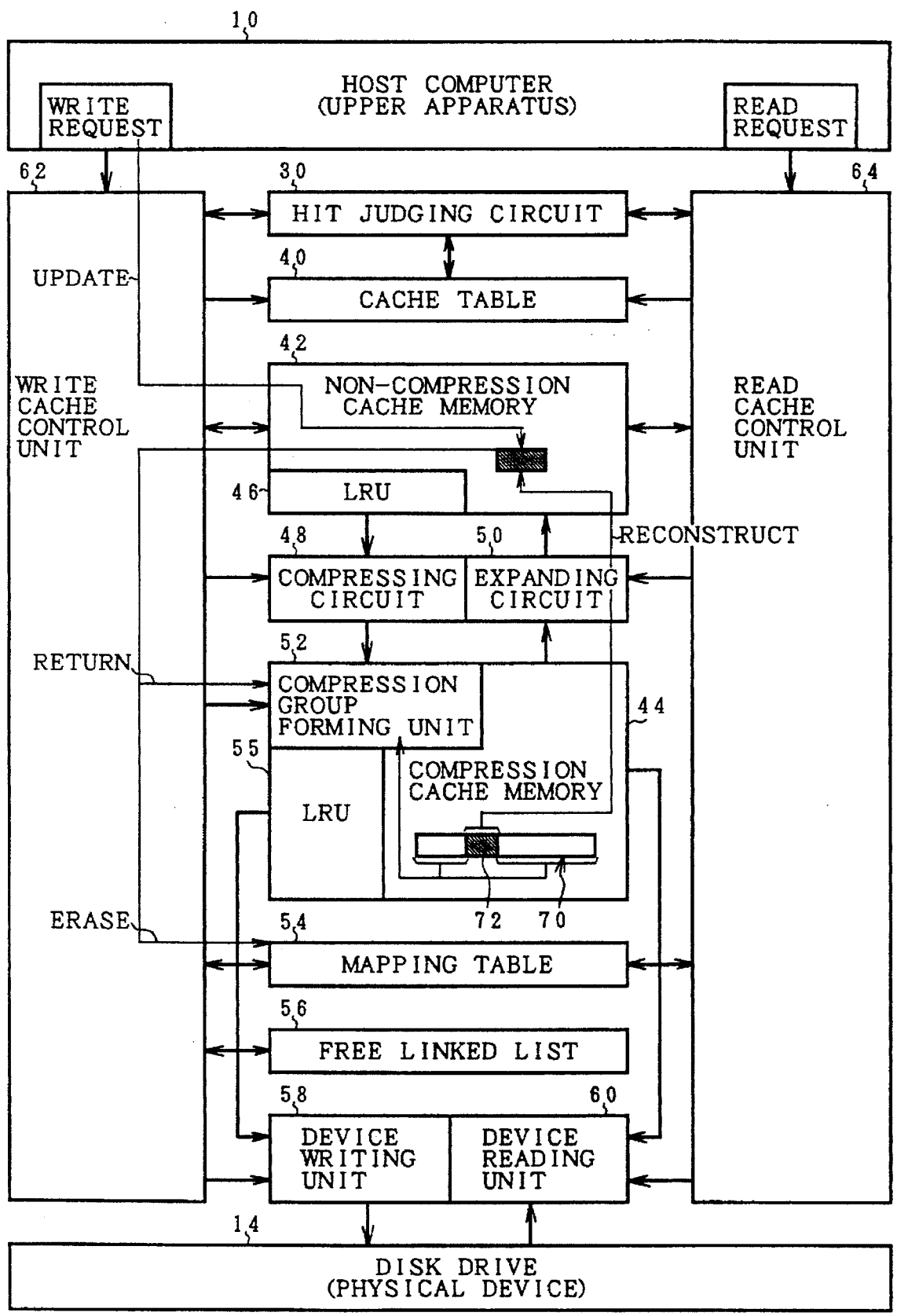
FIG. 15 is an explanatory diagram of a writing process when a hit occurs in a compression cache.

FIG. 15 relates to the case where data exists in the compression cache memory 44. When the write cache control unit 62 requests the hit judging circuit 30 to discriminate about the hit by receiving the write request by the designation of the logic block number from the host computer 10, it will be understood that the compression block 72 of the corresponding logic block number exists in the compression cache memory 44 by referring to the cache table 40. Therefore, the write cache control unit 62 recognizes the relative position from the head of the compression block 72 included in the compression group 70 and the data length with reference to the mapping table 54. The control unit 62 extracts the compression block 72, expands it by the expanding circuit 50, and develops as a cache block 68 into the non-compression cache memory 42. Subsequently, the write cache control unit 62 updates the cache block 68 developed in the non-compression cache memory 42 by the write request block from the host computer 10. After completion of the updating of the cache block 68, the relevant updating flag in the cache table 40 is set to ON. All of the logic block numbers of the other compression blocks included in the compression group 70 from which the compression block 72 was extracted are deleted from the mapping table 54. The logic sectors allocated to the compression group 70 are also deleted and the deleted logic sectors are returned to the free linked list 56. After completion of the deletion of the mapping table 54, the other compression blocks included in the compression group 70 other than the updated compression block 72 are returned to the compression group forming unit 52 and are set to candidates to combine a new compression group.

Figure 16:
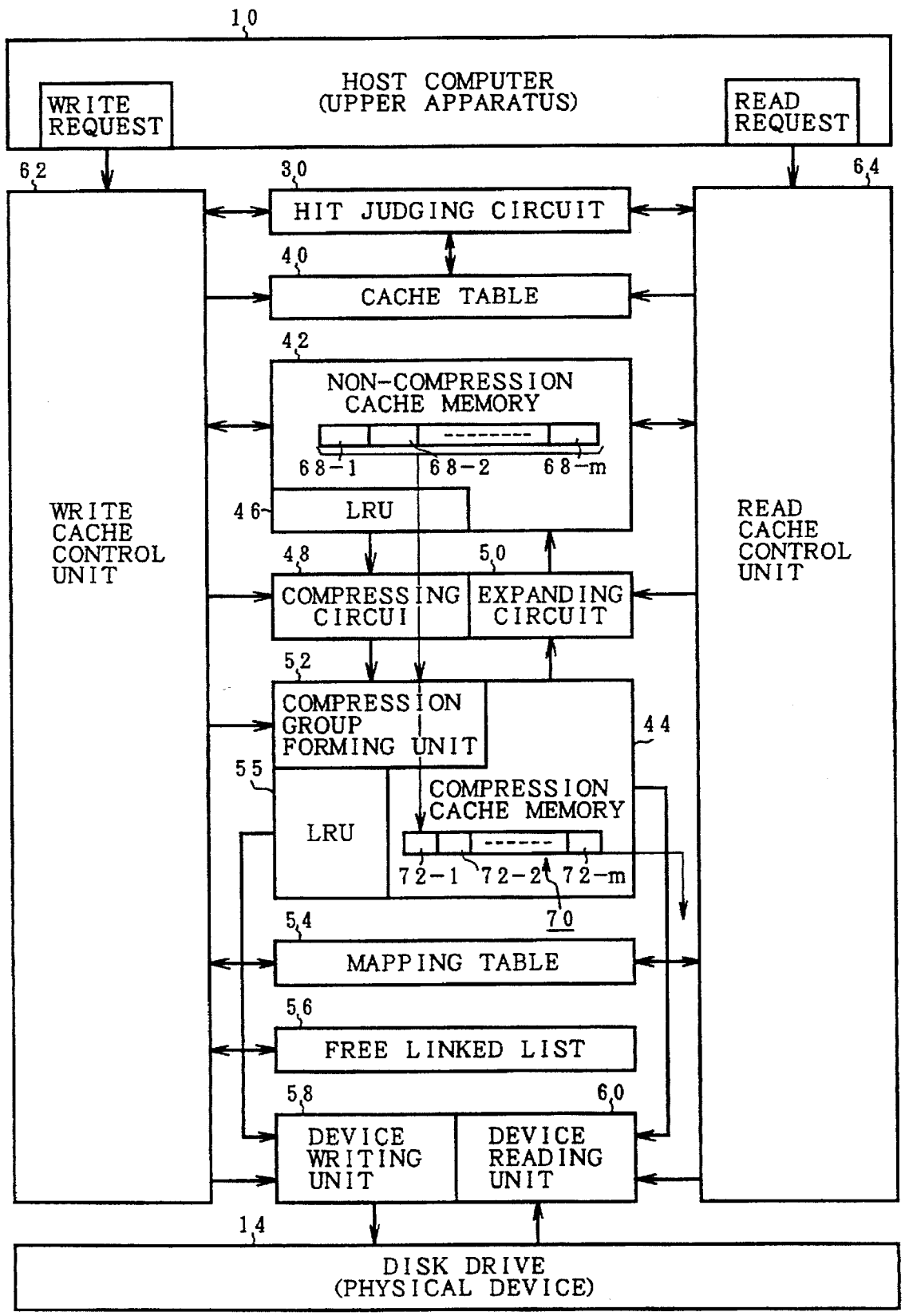
FIG. 16 is an explanatory diagram of a write back process at the time of a cache purge.

FIG. 16 shows a compressing process when a using efficiency of the non-compression cache memory 42 increases and the sweeping-out process of the cache blocks is performed in order to write back and, similarly, a process when a using efficiency of the cache capacity of the compression cache memory 44 increases and the cache sweeping-out process to write back the compression group is executed. In the non-compression cache memory 42, it is assumed that among the cache blocks managed by the LRU unit 46, the cache blocks 68-1 to 68-m were swept out to write back from the disk drive 14 in association with an increase in cache using efficiency. The cache blocks 68-1 to 68-m which were swept out from the non-compression cache memory 42 are supplied to the compressing circuit 48 and compressed on a block unit basis and are combined into a compression group of the unit of 16 kB by the compression group forming unit 52 and are stored into the compression cache memory 44. As mentioned above, as for the contents of the cache table 40 regarding the cache blocks 68-1 to 68-m which were swept out from the non-compression cache memory 42 and were compressed, the compression flag 40-4 in the logic block number 40-1 corresponding to the cache blocks 68-1 to 68-m in FIG. 6 is set to ON. Thus, it will be understood that the cache blocks 68-1 to 68-m exist in the compression cache memory 44 due to the compression. It is assumed that among a plurality of compression data stored in the compression cache memory 44, the using efficiency of the cache capacity increases and, for example, the compression group 70 is swept out by the LRU unit 55. A plurality of compression blocks 72-1 to 72-m derived by the compression of the cache blocks which were swept out from the non-compression cache memory 42 are combined to the compression group 70. In this instance, the write cache control unit 62 allocates the logic sector in an empty state in the head address managed by the MPU 16 to the compression group 70 which was swept out with reference to the free linked list 56. The cache blocks which were swept out from the memory 42 are written into the disk drive 14 by the device writing unit 58. When writing into the disk drive 14 by the write cache control unit 62, the head position of the logic sector in the empty state in the free linked list 56 is allocated. However, the allocation of the logic sector can be also performed by hashing. In case of the allocation of the logic sector by hashing, there is a fear such that the compression groups are stored at random into the disk drive and a seeking performance deteriorates. Therefore, the logic sectors are grouped every cylinder address of the disk drive and are allocated to the compression group by the hashing in the logic sectors included in the same cylinder address. Thus, upon writing back of the compression group, the storage at the same cylinder position is executed. After the seeking operation was once executed, it is sufficient to subsequently execute the head switching operation. Therefore, an accessing performance upon writing back of the compression data can be raised.

Figure 17:
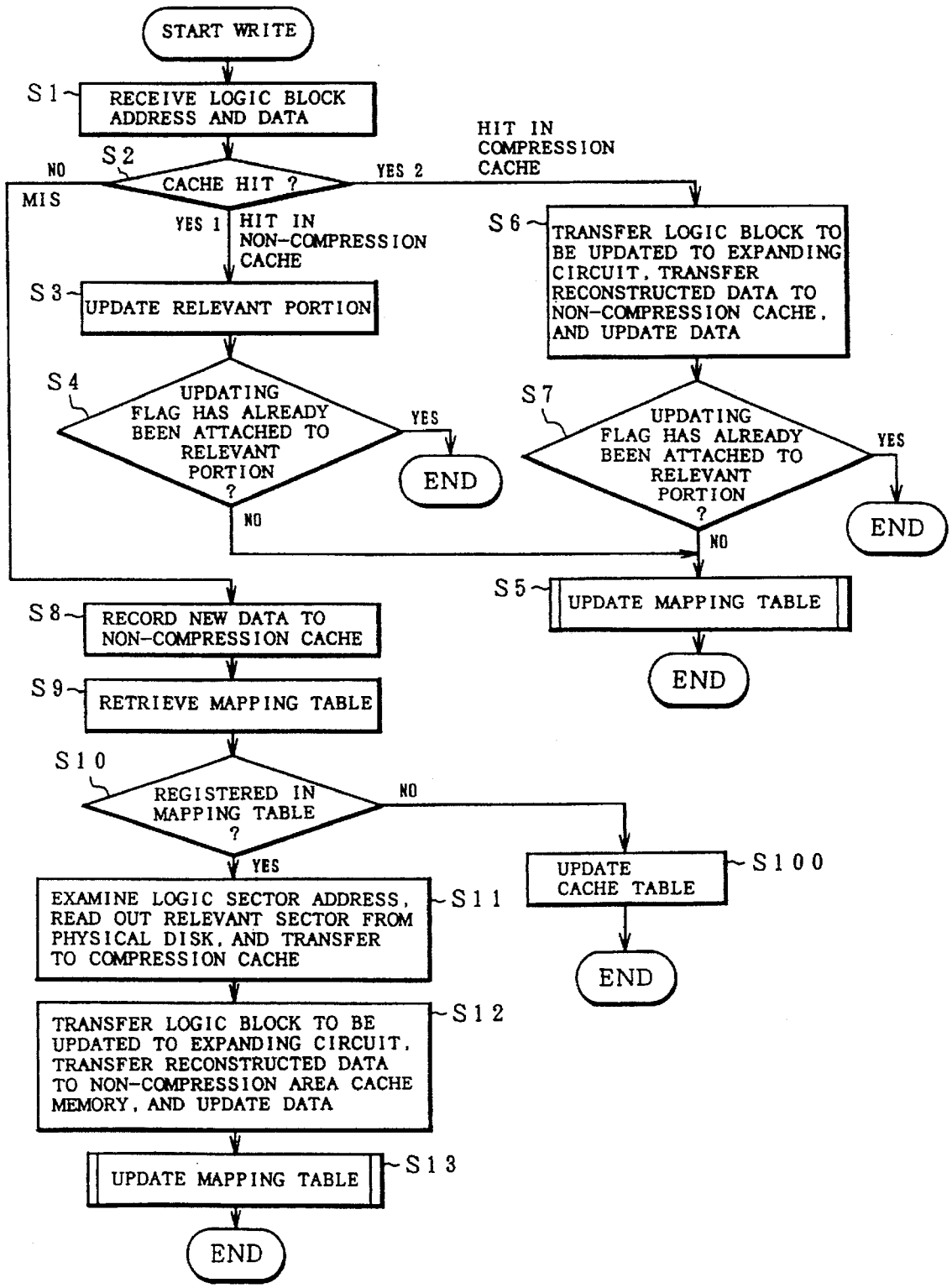
FIG. 17 is a flowchart for a writing process of a write cache control unit.

FIG. 17 shows a flowchart for the writing process in the magnetic disk control unit of the invention. First in step S1, when the logic block address (logic block number) and data (logic block) are received from the host computer 10, a check is made in step S2 to see if a hit has occurred in the cache memory. When data doesn't exist in the non-Compression cache memory 42 and compression cache memory 44, processes in steps S8 to S14 are executed. Those processes correspond to the staging of the cache block 68 for the non-compression cache memory 42 in FIG. 13. Namely, new data is recorded into the non-compression cache memory 42 in step S8. In step S9, the mapping table 54 is referred. In step S10, a check is made to see if the new data has been registered in the mapping table. If there is no registration in the mapping table 54, this means that the data is the new data. Therefore, in step S100, the items regarding the recording of the new data are registered into the cache table and are updated. When there is the registration in the mapping table 54, the new data is included as a compression block in the compression group stored in the disk drive 14. In step S11, therefore, the logic sector number corresponding to the logic block number is examined and the relevant compression group is read out from the disk drive 14 and is transferred to the compression cache memory 44. The compression block derived from the mapping table 54 is extracted from the compression group transferred to the compression cache memory 44 and is expanded by the expanding circuit 50 and is developed into the non-compression cache memory 42. The developed logic block is updated by the new data. After completion of the updating, the processing routine advances to a mapping table updating process in step S13.

Figure 18:
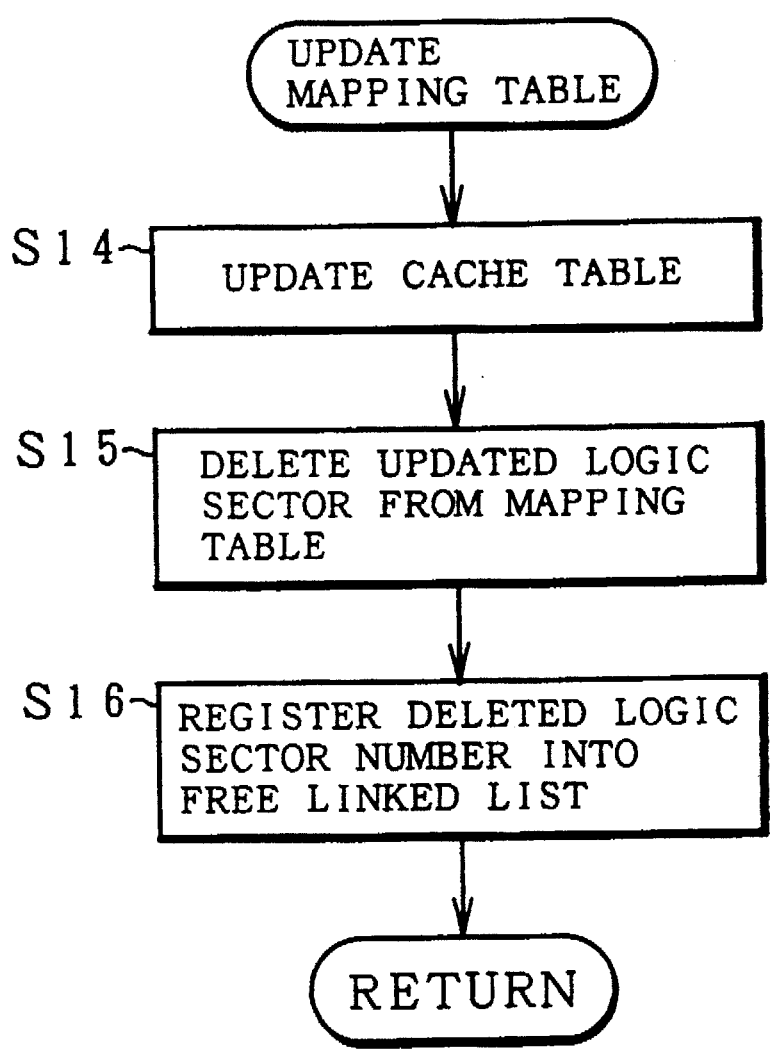
FIG. 18 is a flowchart for an updating process of a mapping table in FIG. 17.

The mapping table updating process is as shown in a flowchart of FIG. 18. First in step S14, the updating flag of the relevant logic block number is set to ON with reference to the cache table 40. In step S15, the updated logic sector is deleted from the mapping table 54. By the deletion of the logic sector, the compression blocks other than the updated compression block in the compression data read out from the disk drive 14 into the compression cache memory 44 are returned to the compression group forming unit 52 and become candidates to form a new compression group. In step S16, the deleted logic sector number is registered into the free linked list 56. The processing routine is returned to the main routine of FIG. 17 and a series of processes are finished. It is also possible to update the data in the disk drive 14 as a write back process in association with the data sweeping-out from the non-compression memory 42 by the LRU without performing the updating process in steps S11 to S13.

When a cache hit occurs in the non-compression cache memory 42, the processes in steps S3, S4, and S5 in FIG. 17 are executed. Those processes relate to the processing operation in FIG. 14. First in step S3, the relevant cache block 68 in the address in which a hit occurred in the non-compression cache memory 42 is updated by the new data from the host computer 10. Subsequently, a check is made to see if the updating flag of the relevant cache block number in the cache table 40 has been set to ON. If the updating flag has already been set to ON, since this means that the updating is the second or subsequent updating process, there is no need to delete the sector number from the mapping table 54. The processing routine is finished. If the updating flag corresponding to the logic block number in the cache table 40 has been reset to OFF, the processing routine advances to a mapping table updating process in step S5. As shown in a subroutine in FIG. 18, in step S14, in the mapping table updating process, the updating flag corresponding to the logic block number in the cache table 40 is set to ON. In step S15, the updated logic sector is deleted from the mapping table 54, the compression group is dispersed, and the compression blocks corresponding to the logic blocks other than the updated logic block are returned to the compression group forming unit 52 and are set to candidates to form a new compression group. In step S16, the deleted logic sector number is returned to the free linked list 56. The processing routine is again returned to the main routine in FIG. 7. A series of processes are finished.

Further, when a cache hit occurs in the compression cache memory 44, the processes in steps S6, S7, and S5 in FIG. 17 are executed as explained in FIG. 15. First, since the compression group 70 including the compression block 72 of the relevant logic block exists in the compression cache memory 44, the compression block 72 is extracted with reference to the mapping table 54 in step S6, is expanded by the expanding circuit 50, and is transferred as a cache block 68 into the non-compression cache memory 42. After completion of the transfer, the data is updated by the write block from the host computer 10. In step S7, a check is made to see if the updating flag of the updated logic block number is ON or OFF. When the updating flag is set to ON, since this means that the deletion in the mapping table 54 has already been finished, the processing routine is finished. When the updating flag is reset to OFF, since this mans that the updating is the first updating process, the mapping table updating process in step S5 is executed. Namely, the updating flag in the cache table 40 is set to ON as shown in step S14 in FIG. 18. In step S15, the logic sector including the compression block of the updated logic block is deleted from the mapping table 54. Thus, the compression group 70 including the compression block 72 as a target of the updating in the compression cache memory 44 is dispersed. The compression blocks other than the compression block 72 are returned to the compression group forming unit 52 and become candidates to form a new compression group. In step S16, the deleted logic sector number is registered into the free linked list 56. The processing routine is returned to the main routine in FIG. 17 and a series of processes are finished.

[Reading process of data]

Figure 19:
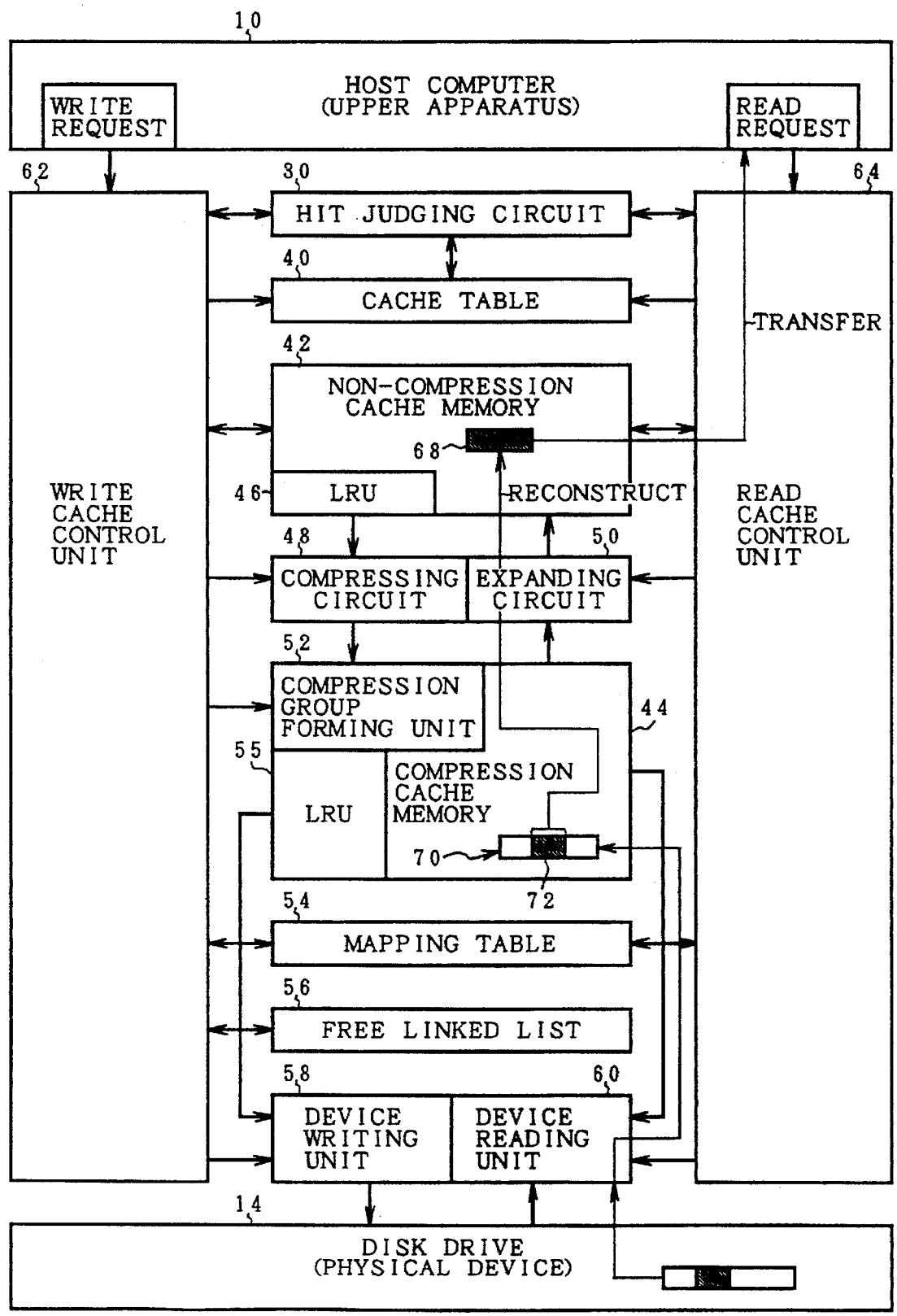
FIG. 19 is an explanatory diagram of a reading process when a mishit occurs in a cache.

FIG. 19 shows the reading process in the magnetic disk control unit 12 of the invention and relates to the case where the request data doesn't exist in the non-compression cache memory 42 and compression cache memory 44 but exists in the disk drive 14. When the read request in which the logic block number was designated from the host computer 10 is received by the read cache control unit 64, a hit judgment is requested to the hit judging circuit 30. The hit judging circuit 30 refers to the cache table 40 by the logic block number. In this case, however, since the data doesn't exist in the non-compression cache memory 42 and compression cache memory 44, the designated logic number is not registered in the cache table and the occurrence of the mishit is discriminated. When the judgment result of the mishit is obtained from the hit judging circuit 30, the read cache control unit 64 recognizes the logic sector number with reference to the mapping table 54 by the designated logic block number. The compression group 70 stored in the logic sector searched from the disk drive 14 is read out by the device reading unit 60 and is developed into the compression cache memory 44. Subsequently, the relative position from the head and the data length in the group corresponding to the logic block number are recognized from the mapping table 54. The compression block 72 is extracted and expanded by the expanding circuit 50 and is developed into the non-compression cache memory 42. The logic block developed in the non-compression memory 42 is transferred to the host computer 10. A series of processes are finished.

Figure 20:
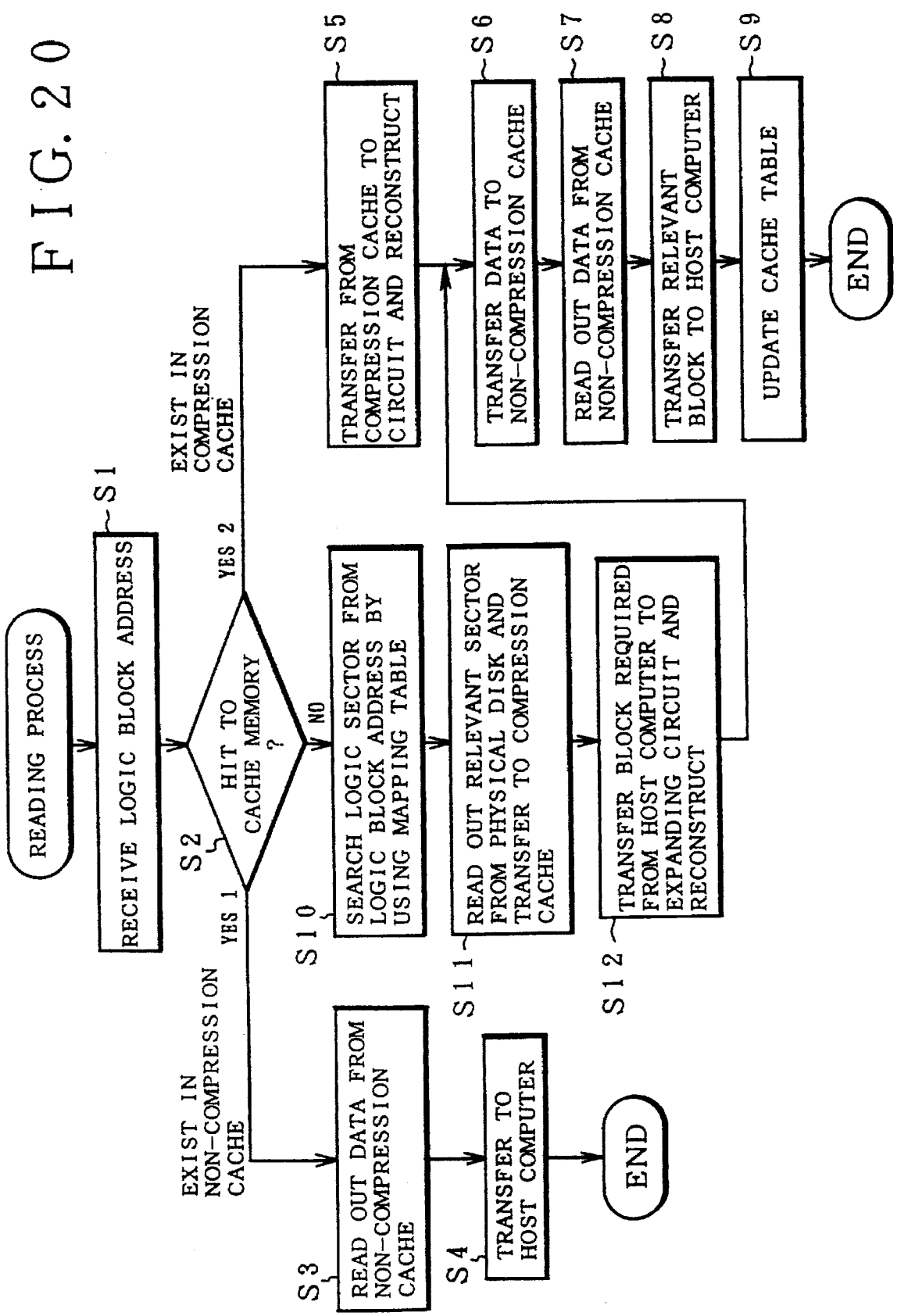
FIG. 20 is a flowchart for a reading process of a read cache control unit.

When the data exists in the disk drive 14, processes in steps S1, S2, S10 to S12, and S6 to S9 in the flowchart of FIG. 20 are executed. First in step S1, the logic block number by the read request from the host computer 10 is received. In step S2, when it is recognized that the logic block doesn't exist in the non-compression cache memory 42 and compression cache memory 44, step S10 follows. In step S10, the logic sector number is searched from the logic block number by using the mapping table 54. In step S11, the compression group of the relevant logic sector is read out from the disk drive 14 and is transferred to the compression cache memory 44. In step S14, the compression block corresponding to the block requested from the host computer 10 is extracted from the compression group 70 transferred to the compression cache memory 44 and is transferred to the expanding circuit 50 and is reconstructed. In step S6, the data is transferred to the non-compression cache memory 42. The transferred data is read out from the non-compression cache memory in step S7 and is transferred to the host computer in step S8. Finally, in step S9, a fact that the reconstructed cache block 68 exists in the non-compression cache memory 42 is registered together with the logic block number into the cache table 40. At the same time, a fact that the other compression blocks which belong to the same compression group 70 as the compression block 72 of the logic block as a target to be read out exist in the compression cache memory 44 is registered together with the respective logic block numbers. With respect to the logic block number which was subjected to the read request, the compression block 72 exists in the compression cache memory 44 and the reconstructed compression block 68 also exists in the non-compression cache memory 42. In this case, however, it is sufficient that, the compression flag is reset to OFF and only a fact that the cache block 68 exists in the non-compression cache memory 48 is registered into the cache table 40. On the other hand, with regard to the case where the other logic blocks included in the compression group 70 which is not reconstructed exists in the non-compression cache memory 42, the compression flag is set to 1 in order to indicate that the compression block exists in the compression cache memory 44.

The case where the data exists in the non-compression cache memory 40 for the read request from the host computer 10 will now be described. In this case, the processes in steps S3 and S4 in FIG. 20 are executed. Namely, in step S3, the data is read out from the address in the non-compression cache memory 42 obtained with reference to the cache table 40. The data is transferred to the host computer 10 in step S4. The processing routine is finished.

Further, in the case where the data exists in the compression cache memory 44 for the read request from the host computer 10, processes in steps S5 to S9 in FIG. 20 are executed. First in step S5, the mapping table 54 is referred and the relative position from the head and the data length in the compression group 70 stored in the compression cache memory 44 of the logic block which was subjected to the read request are recognized. The relevant compression block 72 is extracted and is reconstructed by the expanding circuit 50. The reconstructed compression block is transferred to the non-compression cache memory 42 in step S6. In step S7, the data is read out from the non-compression cache memory 42. In step S8, the relevant block is transferred to the host computer 10. In step S9, since the data has been reconstructed into the non-compression cache memory 42, the cache table 40 in which the compression flag of the logic block number which was subjected to the read request is reset to 0 is updated.

[Duplexed construction]

Figure 21:
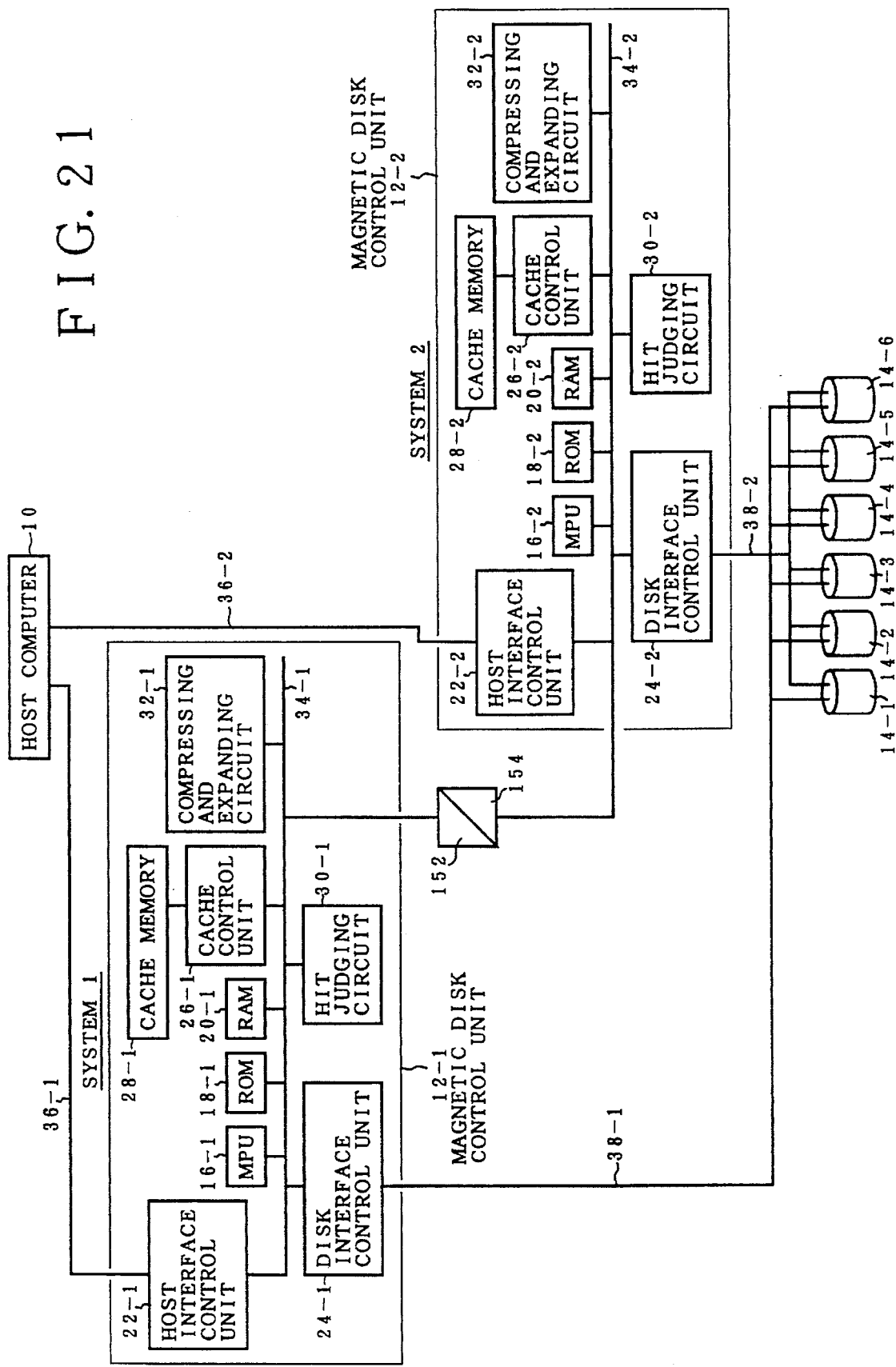
FIG. 21 is a block diagram of a duplex configuration.

FIG. 21 shows another embodiment of the invention and is characterized in that two systems of the magnetic disk control unit 12 in FIG. 1 are provided, thereby forming a duplexed construction for the host computer and disk drive. First, a system 1 is constructed by a magnetic disk control unit 12-1 and a system 2 is constructed by a magnetic disk control unit 12-2. The magnetic disk control units 12-1 and 12-2 have the same construction and comprise: MPUs 16-1 and 16-2; ROMs 18-1 and 18-2; RAMs 20-1 and 20-2; host interface control units 22-1 and 22-2; disk interface control units 24-1 and 24-2; cache control units 26-1 and 26-2; cache memories 28-1 and 28-2; hit judging circuits 30-1 and 30-2; compressing and expanding circuits 32-1 and 32-2; and internal buses 34-1 and 34-2. The magnetic disk control units 12-1 and 12-2 of the systems 1 and 2 are connected to the host computer 10 through independent channel buses 36-1 and 36-2. The magnetic disk control units 12-1 and 12-2 are also connected to the disk drives 14-1 to 14-6 constructed by disk arrays through independent device buses 38-1 and 38-2. The internal bus 34-1 of the magnetic disk control unit 12-1 and the internal bus 34-2 of the magnetic disk control unit 12-2 are connected through the bridge buffer interface 152 and peripheral logic 154 and can transmit and receive command messages and data to/from the MPUs 16-1 and 16-2. Such a duplexed construction corresponds to the module constructions of the systems 1 and 2 in FIG. 2 in a hardware manner.

By the duplexing, the functions of the magnetic disk control units 12-1 and 12-2 constructed by the systems 1 and 2 are fundamentally the same as the functional block of FIG. 4. Namely, both of the magnetic disk control units 12-1 and 12-2 have the functions as write cache control unit 62 and read cache control unit 64 and fundamentally execute independent operations for a request from the host computer 10. On the other hand, for example, when a mishit occurs in the system 1 which received the request from the host computer 10, the disk drive is not immediately accessed but a cache hit of the system 2 is judged. When the data is updated in the cache memory 28-1 of the system 1, the copy of the updated data and the updating of the mapping table are executed in order to guarantee the consistency with the cache memory 28-2 of the system 2.

[Writing process of duplexed system]

Figure 22:
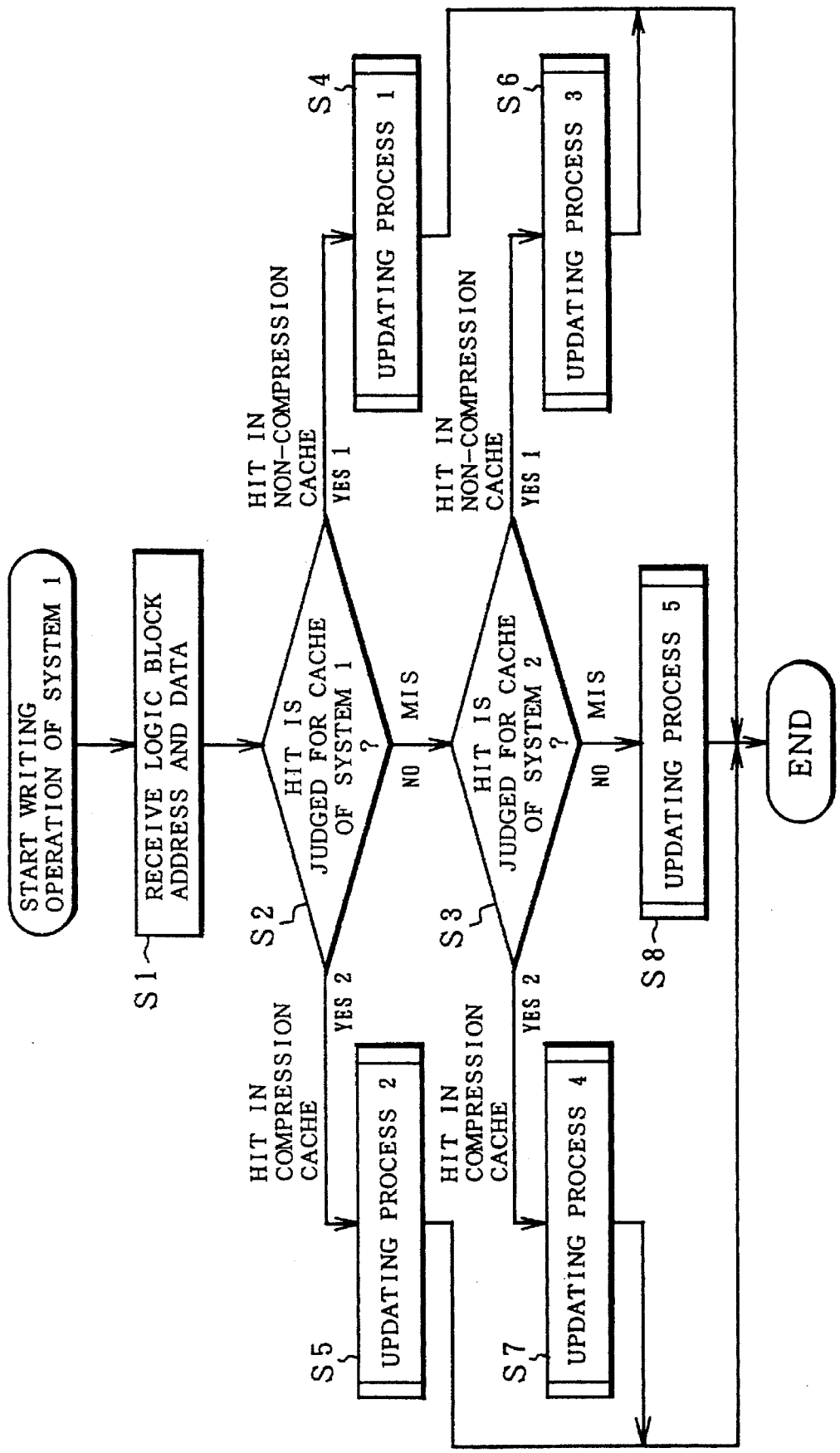
FIG. 22 is a flowchart for a writing process of the duplex configuration.

FIG. 22 shows processes when the magnetic disk control unit 12-1 of the system 1 received the write request from the host computer 10. First in step S1, when the logic block number and data (logic block) are received from the host computer 10, a check is made in step S2 to see if a hit has occurred in the cache memory 28-1 of the system 1. The hit judgment of the cache memory 28-1 is executed with regard to the non-compression cache memory 42 and compression cache memory 44 as shown in the functional block of FIG. 4. When a hit occurs in the non-compression cache memory 42 of the system 1, an updating process 1 in step S4 is executed. When a hit occurs in the compression cache memory 44 of the system 1, an updating process 2 in step S5 is executed. When a mishit occurs in both of the non-compression cache memory 42 and compression cache memory 44 of the system 1, step S3 follows and the hit judgment is requested to the disk control unit 12-2 of the system 2. Thus, when a hit occurs in the non-compression cache memory 42 of the system 2, an updating process 3 in step S6 is executed. When a hit occurs in the compression cache memory 44 of the system 2, an updating process 4 in step S7 is executed. Further, when a mishit occurs in both of the cache memories 28-1 and 28-2 of the systems 1 and 2, an updating process 5 in step S8 is executed.

Figure 23:
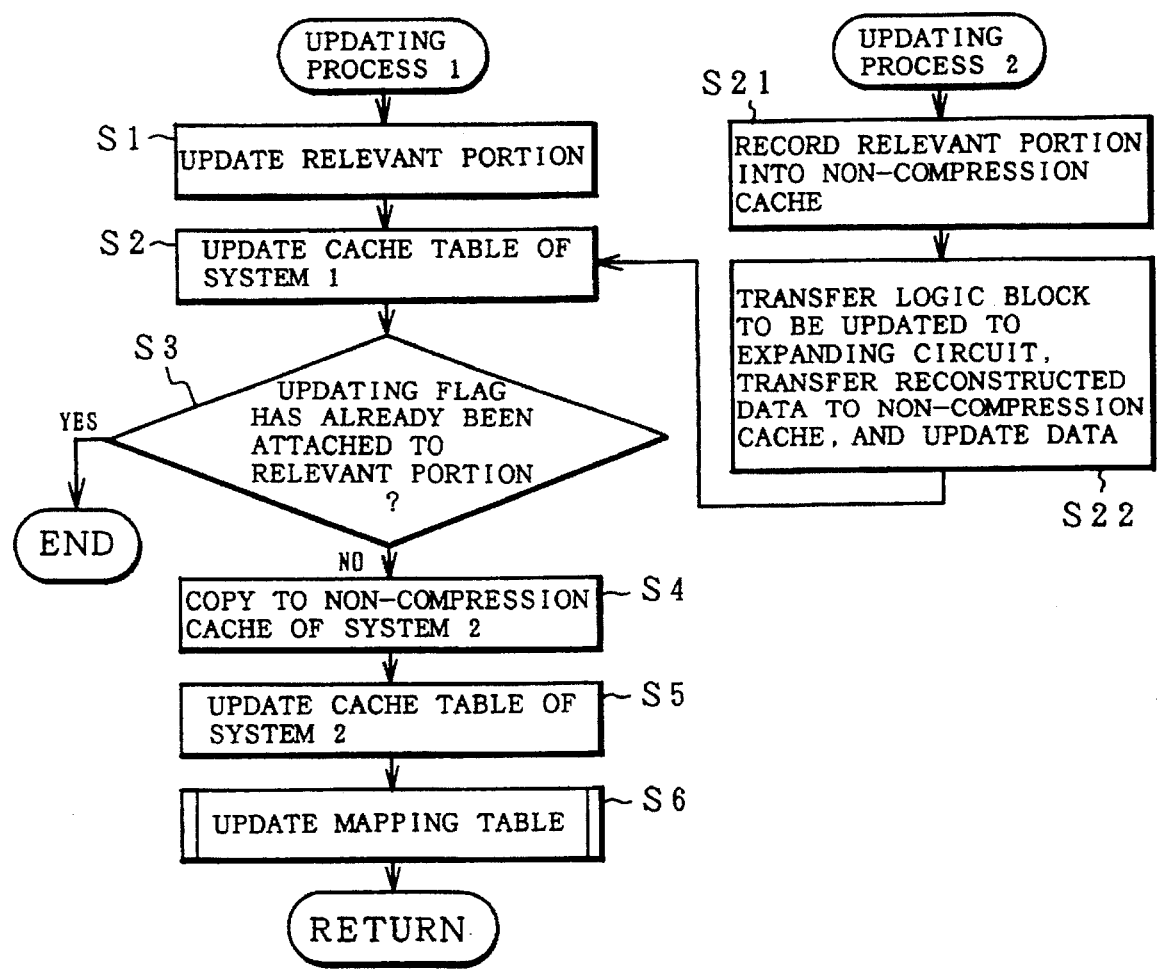
FIG. 23 is a flowchart for updating processes 1 and 2 in FIG. 22.

FIG. 23 shows the updating process 1 in the case where the hit occurs in the non-compression cache memory 42 of the system 1 in step S2 in FIG. 22 and the updating process 2 in the case where the hit occurs in the compression cache memory 44. The updating process 1 will now be described hereinbelow with respect to the functional block of FIG. 4. First in step S1, since the data of the logic block number which was subjected to the write request exists in the non-compression cache memory 42, the data is updated by the write data. In step S2, the updating flag corresponding to the block number of the updated data in the cache table 40 is set to 1. In step S3, a check is made to see if the updating flag has already been set to 1. If YES, since there is no need to delete the logic sector from the mapping table 54, the processing routine is finished. When the updating flag is reset to 0 before updating and the updating flag is set to 1 in step S1, the updating is the first updating process. Therefore, the updated block is transferred to the system 2 and is copied into the non-compression cache memory 42 of the system 2. In step S5, the updating flag of the relevant logic block number in the cache table 40 of the system 2 is set to 1. In step S6, a mapping table updating process is executed.

Figure 24:
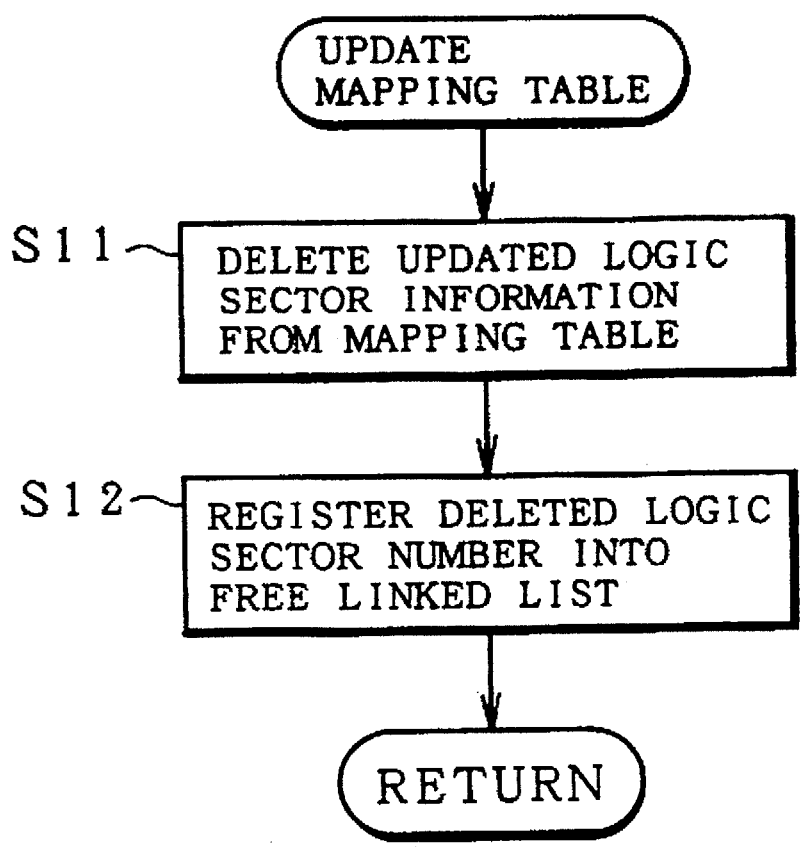
FIG. 24 is a flowchart for an updating process of a mapping table in FIG. 23.

The mapping table updating process corresponds to steps S11 and S12 in FIG. 24. First in step S11, the logic sector number allocated to the compression group including the compression block of the updated logic block is deleted from the mapping table 44. In this instance, when the compression group in which the updated logic block was expanded in the non-compression cache memory 42 remains in the compression cache memory 44, the compression blocks of the other logic blocks included in the compression group are returned to the compression group forming unit 52 and are set to candidates to form a new compression group. In step S12, the deleted logic sector number is returned to the free linked list 56.

The updating process 2 in FIG. 23 will now be described. The updating process 2 is executed in the case where a hit occurs in the compression cache memory 44 in FIG. 4 in the system 1. First in step S1, the logic block which was received from the host computer 10 and becomes a target to be written is recorded into the non-compression cache memory 42. In step S2, the mapping table 54 is referred by the logic block number to be updated, the relevant compression block is extracted on the basis of the number of offset sectors and data length from the group head position of the relevant compression group existing in the compression cache memory 44 and is reconstructed by the expanding circuit 50 and is transferred to the non-compression cache memory 42. The data updating by the logic block recorded in step S1 is executed. After completion of the data updating on the non-compression cache memory 42, the same processes as those in steps S2 to S6 of the updating process 1 are executed. Namely, the updating flag corresponding to the logic block number in the cache table 40 of the system 1 is set to 1 in step S2. In step S3, a check is made to see if the updating flag has already been set to 1. If YES, the processing routine is finished. When the updating flag is reset to 0, since the updating is the first updating process, step S4 follows. The updated block is copied into the non-compression cache memory of the system 2. In step S5, the relevant updating flag in the cache table of the system 2 is set to 1. The mapping table updating process in step S6 is executed. Namely, the logic sector corresponding to the updating block is deleted from the mapping table 54 in step S11 in FIG. 24. In step S12, the deleted logic sector number is registered into the free linked list 56.

Figure 25:
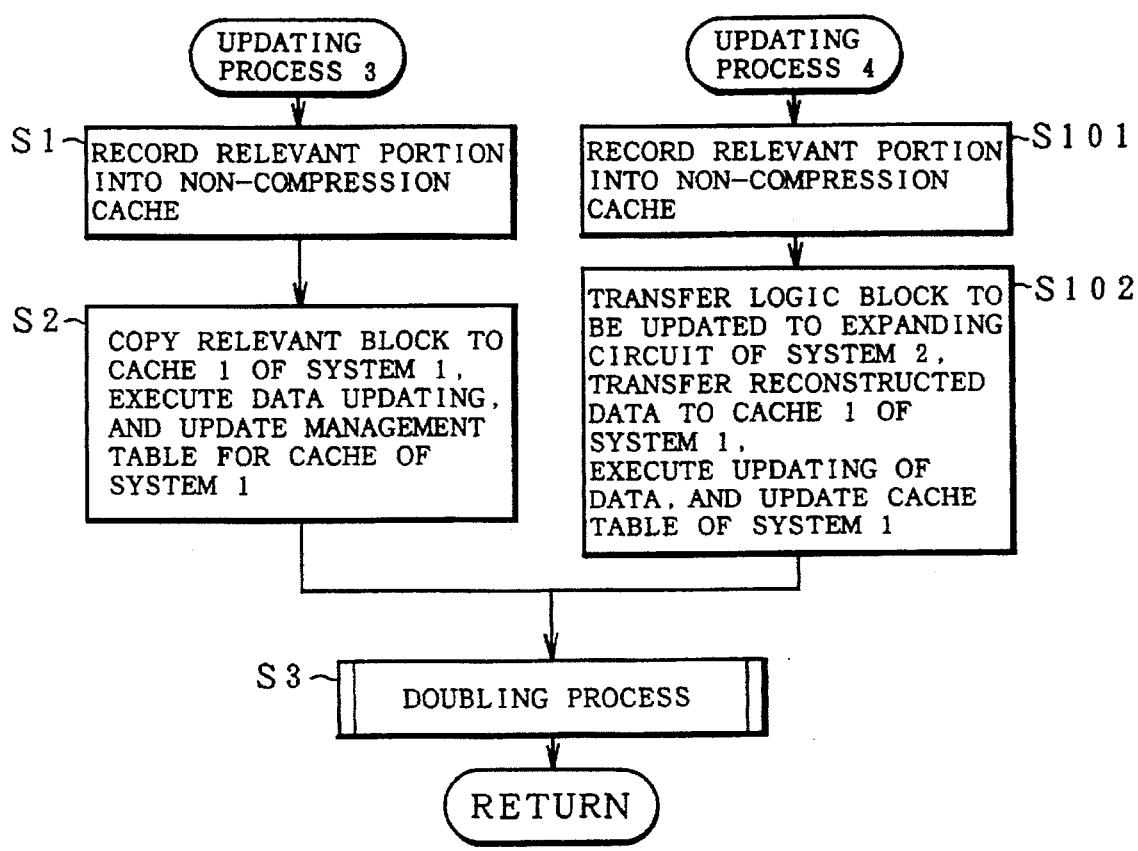
FIG. 25 is a flowchart for updating processes 3 and 4 in FIG. 22.

FIG. 25 shows the details of the updating processes 3 and 4 in FIG. 22. First, as shown in FIG. 22, the updating process 3 relates to the case where a cache mishit occurs in the system 1 and a hit occurs in the non-compression cache memory 42 of the system 2. First in step S1, the logic block from the host computer 10 is recorded into the non-compression cache memory 42 of the system 1. In step S2, the relevant block in which a cache hit occurs in the system 2 is read out from the non-compression cache memory 42 and is copied into the non-compression cache memory 42 of the system 1 and the copied block is updated by the recorded logic block in step S2. Further, the updating flag in the cache table 40 of the system 1 is set to 1. Subsequently, a doubling process in step S3 is executed.

Figure 26:
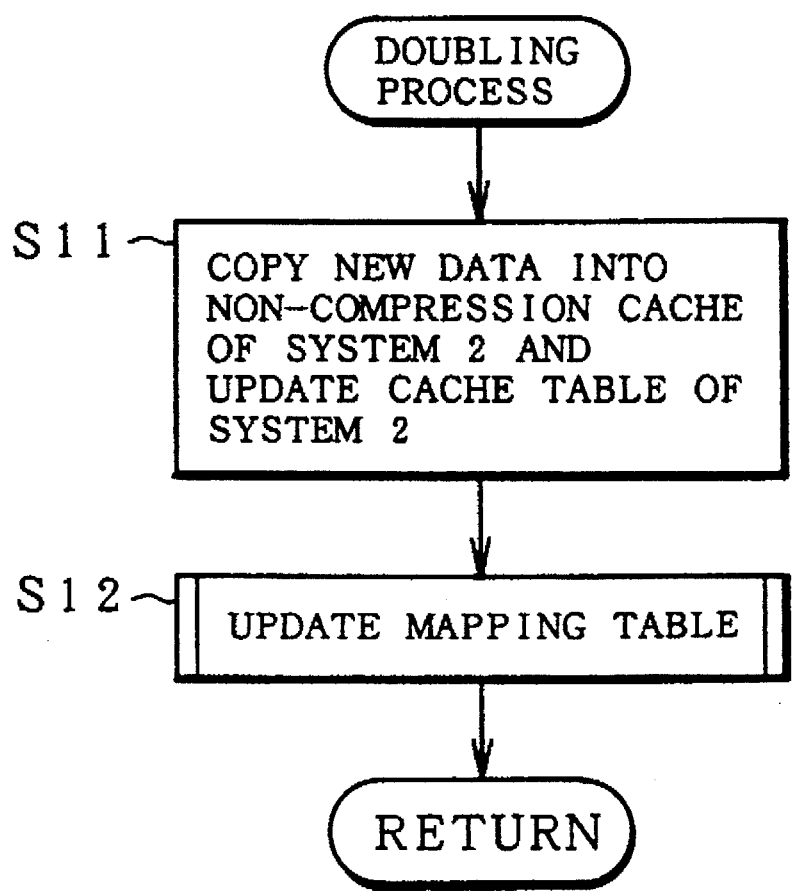
FIG. 26 is a flowchart for a doubling process in FIG. 25.

FIG. 26 shows the details of the doubling process in FIG. 22. First in step S11, the new data updated in the non-compression cache memory 42 of the system 1 is copied into the non-compression cache memory 42 of the system 2. The relevant updating flag in the cache table 40 of the system 2 is set to 1. In step S4, the mapping table updating process is executed. That is, as shown in FIG. 24, in step S11, the logic sector number corresponding to the logic block number of the updated logic block is searched from the mapping table 56 of the system 2 and the logic sector number is deleted. At the same time, the other logic blocks included in the same compression group as the updated block are also deleted from the mapping table 56 and are returned to the compression group forming unit 52 and become the candidates to form a new compression group. With respect to the system 1 side in which the relevant block doesn't exist on the cache memory, it is also desirable to delete the logic sector number corresponding to the updated block number in order to guarantee a consistency of the mapping table 54.

The updating process 4 in FIG. 25 will now be described. The updating process 4 relates to the case where a mishit occurs in the cache memory of the system 1 and a hit occurs in the compression cache memory 44 of the system 2 as shown in FIG. 22. First in step S101, the relevant logic block from the host computer 10 is recorded into the non-compression cache memory 42 of the system 1. In step S102, the compression block derived by the reference to the mapping table 54 is extracted from the relevant compression data in the compression cache memory 44 of the system 2 and is reconstructed by the expanding circuit 50 and is transferred to the non-compression cache memory 42. Further, the compression block is transferred to the non-compression cache memory 42 of the system 1 and the data updating by the logic block recorded in step S101 is executed. After completion of the data updating, the updating flag of the relevant logic block number in the cache table 40 of the system 1 is set to 1. In step S3, the updating data is transferred to the non-compression cache memory 42 of the system 2 and the cache table 40 of the system 2 is similarly updated. In step S4, the mapping table updating process is executed. Namely, in step S11 in FIG. 24, the logic sector number corresponding to the updating block number is deleted from the mapping table 54 of the system 2. Thus, the compression blocks of the other logic block numbers included in the same compression group as the updating block number are returned to the compression group forming unit 52 and become candidates to form a new compression group. In step S14, the deleted logic sector number is registered into the free linked list 56. In this case, it is also desirable to similarly delete from the mapping table 54 on the system 1 side to thereby guarantee the consistency.

Figure 27:
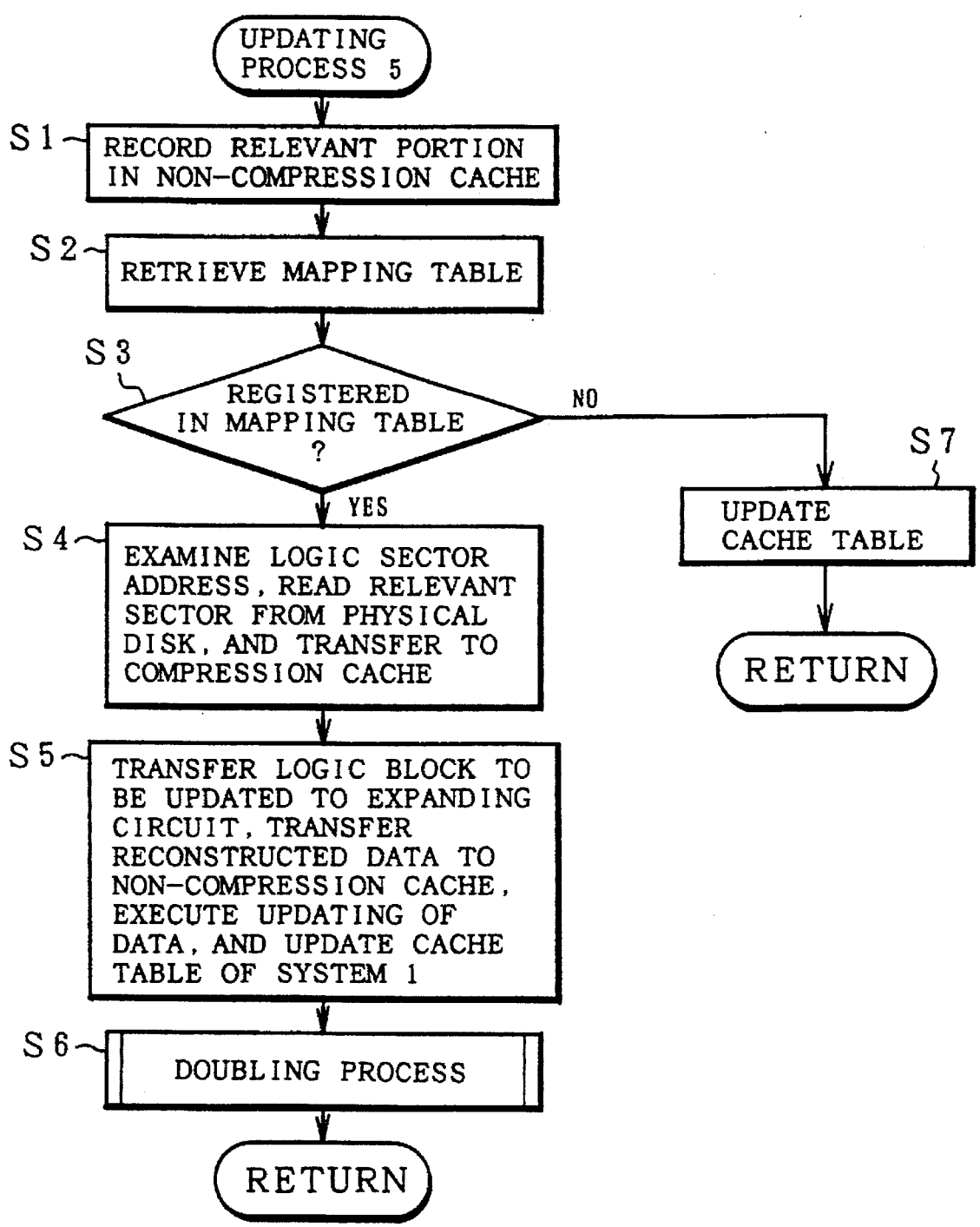
FIG. 27 is a flowchart for an updating process 5 in FIG. 22.

FIG. 27 shows the details of the updating process 5 in FIG. 22 and relates to processes in the case where a mishit occurs in both of the systems 1 and 2 and the data is read out from the disk drive 14 and is updated. First in step S1, the logic block which was subjected to the write request from the host computer 10 is recorded into the non-compression cache memory 42 of the system 1. In step S2, the mapping table 54 of the system 1 is searched. In step S3, a check is made to see if the requested logic block number has been registered in the mapping table 54 or not. If NO, since this means that the new data is written, the address in the cache corresponding to the new logic block number and the data length are registered into the cache table 40 in step S7. In this case, the table is updated so as to reset the compression flag to 0 and to also reset the updating flag to 0. When the requested logic block number is registered in the mapping table 54, since this means that it has already been stored in the disk drive 14, the logic sector number is examined. The compression group of the relevant logic sector is read out from the disk drive 14 and is transferred to the compression cache memory 44. In step S5, on the basis of the relative position from the group head position and the data length which were obtained by the reference to the mapping table 54, the relevant compression block is extracted from the compression group transferred to the compression cache memory 44 and is reconstructed by the expanding circuit 50 and is transferred to the non-compression cache memory 42. The data updating by the logic block recorded in step S1 is executed. After completion of the updating, the updating flag of the relevant logic block number in the cache table 40 is set to 1. The doubling process in steps S11 and S12 in FIG. 26 is subsequently executed. Namely, in step S11, the updated block is copied into the non-compression cache memory 42 of the system 2 and the cache table 40 of the system 2 is similarly updated. In step S12, the mapping table updating process in FIG. 24 is executed. In step S11, the logic sector number corresponding to the logic block number of the updating block is deleted from the mapping table 54 of the system 1. Thus, the compression blocks other than the updating block of the compression cache memory 44 are returned to the compression group forming unit 52 and become candidates to form a new compression group. Finally, in step S12 in FIG. 24, the deleted logic sector number is registered into the free linked list 56. With respect to the mapping table 54 of the system 2, since there are the registered numbers corresponding to the updated logic block number and logic sector number for the disk drive 14, the logic sector number is similarly deleted and is registered into the free linked list 56.

The writing process in the above duplexed construction has been described with respect to the process for the write request from the host computer to the system 1 as an example. However, in the case where there is a write request from the host computer to the system 2, similar processes in which the system 2 side is set to the main part are executed.

[Reading process of the duplexed construction]

Figure 28:
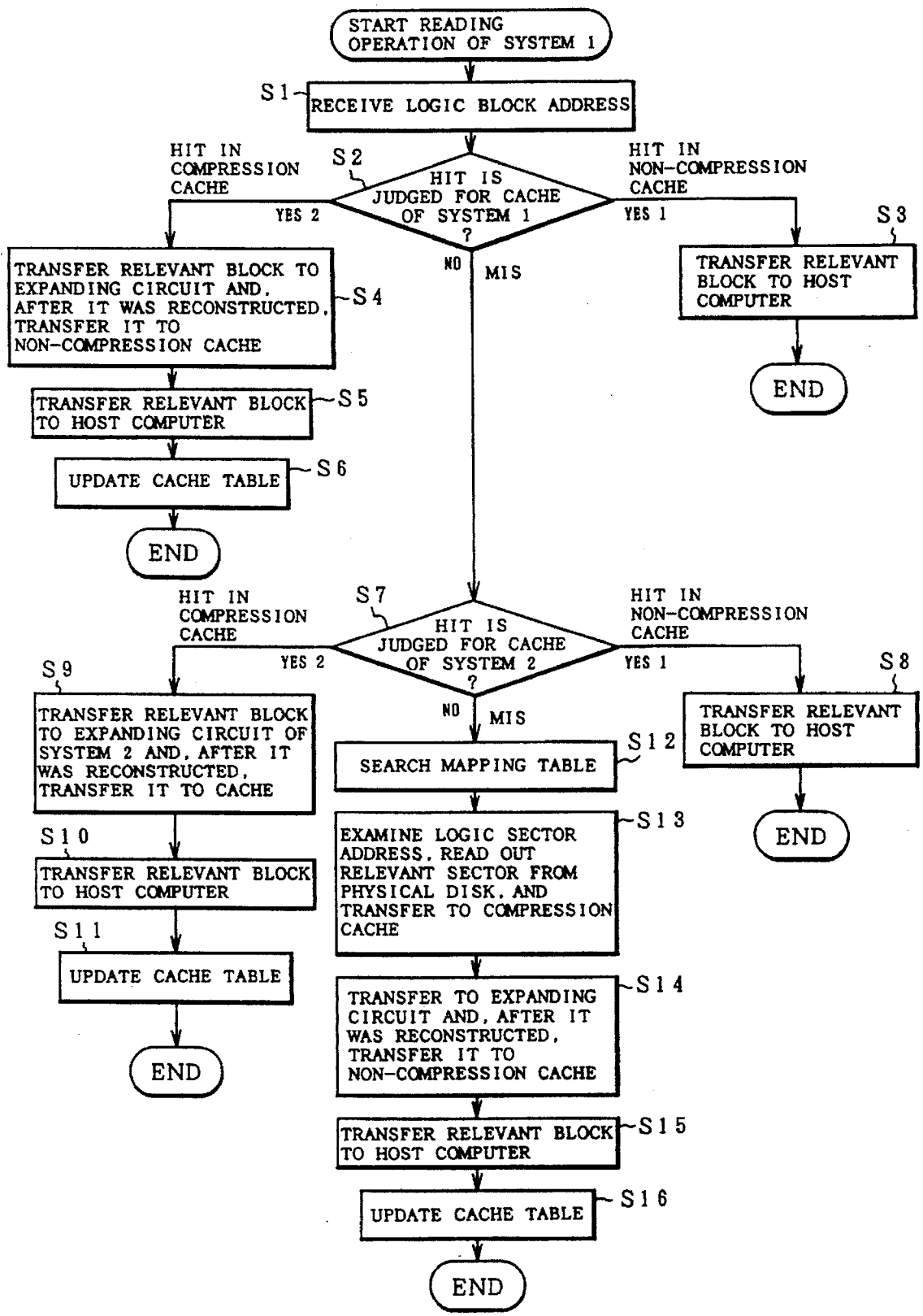
FIG. 28 is a flowchart for a reading process of the duplex configuration.

A flowchart of FIG. 28 relates to the reading process in the duplexed construction in FIG. 21. The reading process will now be described hereinbelow with reference to the functional block of FIG. 4. First, when there is a read request from the host computer 10 to the system 1, the logic block number is received in step S1. When the occurrence of the hit in the non-compression cache memory 42 of the system 1 is judged in step S2 by the hit judgment by the logic block number, the relevant block is transferred to the host computer 10 in step S3 and the processing routine is finished. In step S2, when the hit occurs in the compression cache memory 44 of the system 1, in step S4, the mapping table 54 is referred by the logic block number and the relevant compression block in the compression group in the compression cache memory 44 is extracted and reconstructed by the expanding circuit 50 and is transferred to the non-compression cache memory 42. In step S5, the relevant block is transferred to the host computer 10. Finally, in step S6, the compression flag of the relevant logic block number in the cache table 40 is reset to 0 and the table updating indicating that the data exists as non-compression data in the non-compression cache memory 42 is executed.

When a mishit occurs in both of the non-compression cache memory 42 and compression cache memory 44 of the system 1, step S7 follows and a check is made to see if a hit has occurred in the cache memory of the system 2. In the case where the hit occurs in the non-compression cache memory 42 of the system 2 by the hit judgment of the system 2, the relevant block is read out and transferred to the host computer 10 in step S8. The transfer of the relevant block from the system 2 can be also performed via the system 1 or can be also directly performed from the system 2 to the host computer 10. When a hit occurs in the compression cache memory 44 of the system 2, in step S9, by referring to the mapping table 54 by the requested logic block number, the relevant compression block in the compression data in the compression cache memory 44 is extracted and reconstructed by the expanding circuit 50 and is transferred to the non-compression cache memory 42. In step S10, the block transferred to the non-compression cache memory 42 is transferred to the host computer 10. The transfer in this case can be directly performed from the system 2 or can be also executed via the system 1. Finally, in step S11, the compression flag of the relevant logic block number in the cache table 40 of the system 2 is reset to 0 and the table updating indicating that the data exists in the non-compression cache memory 42 is executed.

Further, when a mishit occurs in both of the systems 1 and 2, the mapping table 54 is searched in step S12 by the logic block number requested in the system 1. In step S13, the compression group of the logic sector number derived by the search of the mapping table 56 is read out from the disk drive and is transferred to the compression cache memory 44. In step S14, the relevant compression block in the read-out compression group is extracted on the basis of the number of offset sectors and the data length in the mapping table 54 and is reconstructed by the expanding circuit 50 and is transferred to the non-compression cache memory 42. In step S15, the relevant block is transferred from the non-compression cache memory 42 and is transferred to the host computer. Finally, in step S16, the logic block number which was newly read out and the address in the cache are registered into the cache table 40 of the system 1. The table updating to reset the updating flag to 0 and to also reset the compression flag to 0 in this instance is executed.

[Block formation of compression data by addition of position flag]

In the above embodiment, as shown in FIG. 8, in the case where the number of compression data obtained by compressing the logic block 68 of 4 kB is less than the value that is integer times as large as the minimum physical sector of the disk drive, the dummy data 82 is added and a compression block having a size that is integer times as large as the minimum physical sector of the disk drive is formed. On the other hand, as another embodiment of the invention, it is also possible to construct in a manner such that no dummy data is added to the compression data but a compression group of 16 kB is formed by continuously combining the logic blocks and a position flag is provided at the head of the compression data in order to specify the position of the compression data in the group.

FIG. 29 is a diagram for explaining a formation of a compression group in the case where there is no need to add the dummy data. It is now assumed that logic block numbers #50 to #57 were stored in the non-compression cache memory 42 as cache blocks 68-1 to 68-8 each having a size of 4 kB. The eight cache blocks 68-1 to 68-8 are swept out by the LRU and are compressed by the compressing circuit 48 and the compression data is continuously stored and a group is formed as shown in the compression groups 70-1 and 70-2 of 16 kB in the compression cache memory 44.

Figures 30, 31:
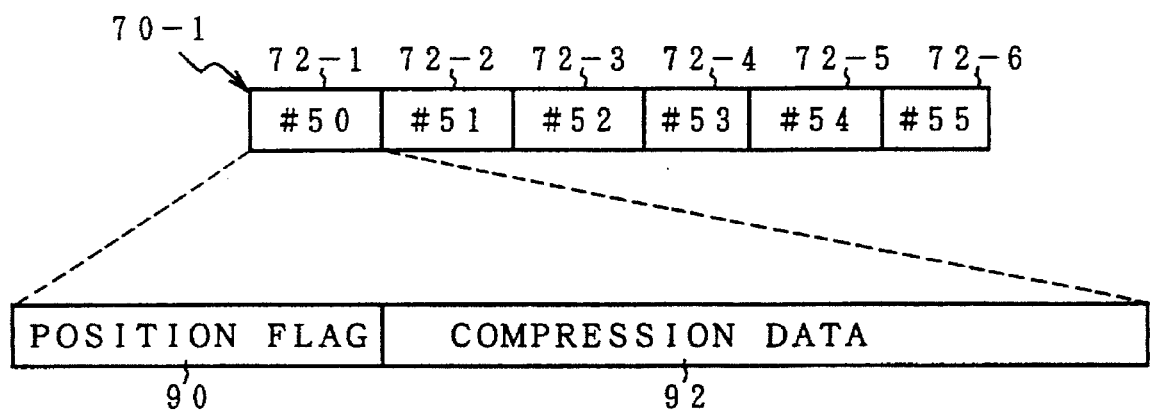
FIG. 30 is an explanatory diagram showing a compression group in FIG. 29.
FIG. 31 is an explanatory diagram of a mapping table which is formed when LRU in the compression group is purged.

FIG. 30 is a diagram showing the compression group 70-1 in FIG. 29 and relates to the case where six compression data 72-1 to 72-6 of the logic block numbers #50 to #55 are combined. As shown by the head compression data 72-1 as a representative, a position flag 90 is added to the head of each of the compression data 72-1 to 72-6. After that, compression data 92 exists. The position flag 90 is information indicative of the position of the compression data 92 in the compression group 70-1. The position flag 90 is fundamentally constructed by three kinds of flags 1, 2, and 3. The flag 1 indicates that the compression data 92 is located at the head position of the group. The flag 2 indicates that the compression data 92 is located in the middle of the group. Further, the flag 3 indicates that the compression data 92 is located in a range from the end of the group to the head of the next group.

When the compression groups 70-1 and 70-2 stored in the compression cache memory 44 in FIG. 29 are swept out in accordance with the LRU, the logic sectors are allocated in accordance with the free linked list in a manner similar to the functional block of FIG. 4 and are stored into the disk drive 14. In this instance, the mapping table 54 as shown in FIG. 31 is formed. The logic sector number 54-2 allocated in correspondence to the logic block number 54-1 is registered into the mapping table 54. Further, a position flag 54-5 provided at the head of the compression data 92 is registered into the mapping table 54. The mapping table 54 in FIG. 31 has the contents when the compression groups 70-1 and 70-2 in the compression cache memory 44 in FIG. 29 are stored into the disk drive. Namely, it will be understood that one compression group is constructed by the logic block numbers #50 to #55 and is stored in the logic sector number 10. Although the logic sector number of the logic block number #55 is equal to 10, since the position flag is a flag 3, it will be understood that the compression group is stored in a range from the end of the logic sector number 10 to the head of the next logic sector number 11. Further, since the position flag indicates the relative position in the group, with respect to a flag 2 indicating that the relative position is in the middle of the group, as shown in the logic block numbers #52 to #54, flag bits indicative of the orders of the positions existing in the middle are added like 2-1 to 2-4. It is sufficient that the number of bits of the position flag is set to about a few bits since the maximum number of compression blocks to be stored into the compression group of 16 kB is limited to, for example, 8.

Figure 32:
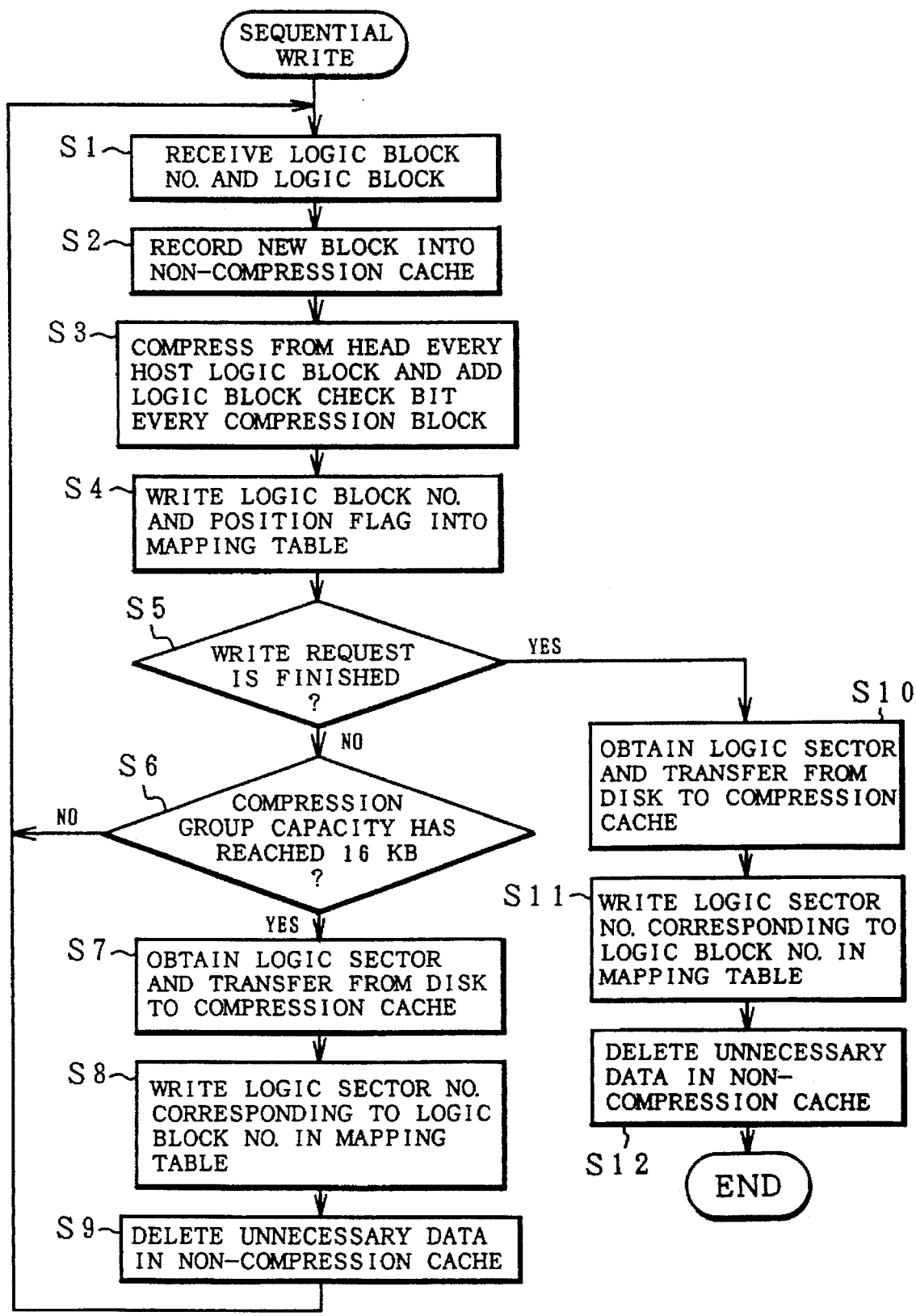
FIG. 32 is a flowchart for a writing process to add a position flag.

FIG. 32 shows the writing process in the case where the position flag is added to the head of the compression data compressed on a logic block unit basis and a compression group is formed. The writing process will now be described hereinbelow with reference to the functional block of FIG. 4. The writing process in FIG. 32 is a sequential writing process in the case where a number of logic block data are continuously received by the write request of file data from the host computer. The sweeping-out process of the cache block from the non-compression cache memory 42 is explained with respect to the case, as an example, where it doesn't depend on the LRU unit 46, new write blocks are continuously supplied to the compressing circuit 48 and compressed and when an amount of compression data reaches 16 kB as a size of compression group in the compression cache memory 44, the data is written into the disk drive 14 as a physical device.

In FIG. 32, first in step S1, when the write cache control unit 62 receives the logic block numbers and block data which are continuously transmitted from the host computer 10 in response to the write request of the file, they are recorded into the non-compression cache memory 42 in step S2. The logic blocks recorded in the non-compression cache memory 42 are immediately supplied to the compressing circuit 48 and compressed. In the compression group forming unit 52, the position in the compression group of 16 kB is subsequently judged. When the position is the head, the position flag 1 is added. When the position is the middle, the position flag 2 and the number indicative of the order in the middle are added. Further, when the position lies within a range from the end of the group to the head of the next group, the position flag 3 is added. When the position flag is added to the compression data by the compression group forming unit 52, in step S4, the added position flag is written into the mapping table 54 in correspondence to the logic block number as shown in FIG. 31. In step S5, a check is made to see if the write request from the host computer 10 has been finished. When the write request is continued, in step S6, a check is made to see if the formation of the compression group of 16 kB has been completed in the non-compression cache memory 44. Namely, a check is made to see if an amount of data stored has reached 16 kB by the storage of the compression data added with the position flag from the compression group forming unit 52. The processes from step S1 are repeated until the amount of stored data of the compression group reaches 16 kB. When the data storage amount of the compression group reaches 16 kB, the processing routine advances to step S7. The logic sector in the empty state of the disk drive 14 is obtained from the free linked list 56 and the compression group is stored into the disk drive. In step S8, the logic sector number obtained is registered into the mapping table 54 in correspondence to the logic block number as shown in FIG. 31. After completion of the storage into the disk drive 14, in step S9, the processed data remaining in the non-compression cache memory 42 and compression cache memory 44 is deleted to assure an empty space of the process of the subsequent block. When the end of the write request is discriminated in step S5, in step S10, even if the capacity of the compression group doesn't reach 16 kB, the logic sector is obtained from the free linked list 56 and is written into the disk drive 14. In step S11, the logic sector number obtained is written into the mapping table 54. In step S12, the unnecessary data in the non-compression cache memory 42 and compression cache memory 44 which has already been written into the disk drive is deleted and the processing routine is finished.

Figure 33:
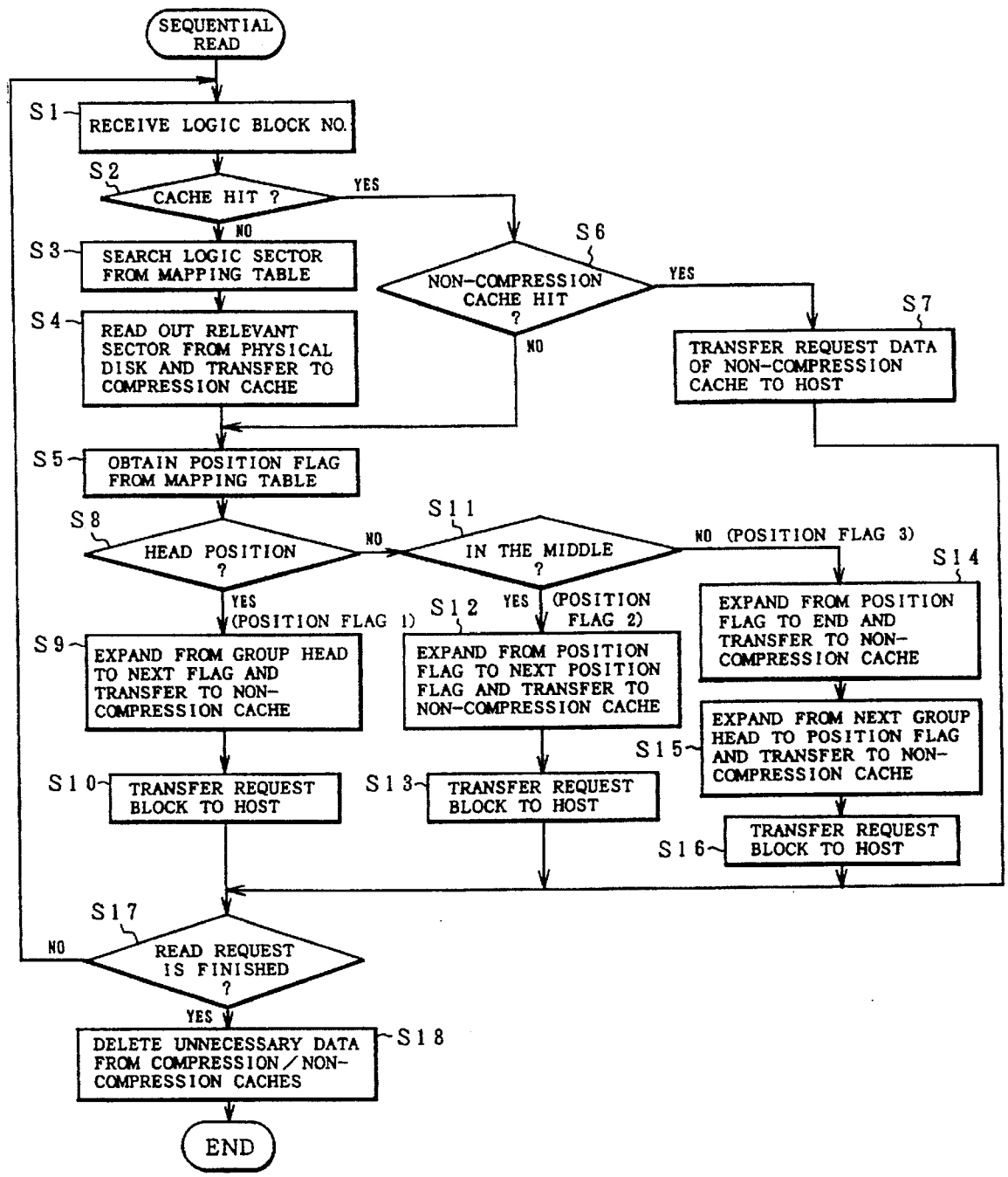
FIG. 33 is a flowchart for a reading process using the position flag.

FIG. 33 shows the sequential reading process of the file data which was compressed and written into the disk drive by the sequential writing process in FIG. 32. When the read cache control unit 64 receives the logic block number by the read request from the host computer 10 in step S1, a check is made in step S2 to see if a cache hit has occurred. When a mishit occurs in the cache memory in step S2, the mapping table 54 is referred and the logic sector number is searched from the logic block number in step S3. The compression data of the relevant sector is read out from the disk drive and transferred to the compression cache memory 44 in step S4. The relevant position flag is obtained from the mapping table 54 in step S5. With respect to the position flag obtained, a check is made in step S8 to see if the position is the head, namely, the position flag is the flag 1 or not. A check is made in step S11 to see if the position is in the middle, namely, the position flag is the flag 2 or not. When it is known from the position flag that the position is the head, the compression data is supplied to the expanding circuit 50 from the head of the compression data in the compression cache memory 44. When the next position flag is derived, the supply to the expanding circuit 50 is stopped. Therefore, only the compression data of the head portion designated by the position flag in the compression group is reconstructed and developed into the non-compression cache memory 42. In step S10, the relevant block is transferred to the host computer. In step S17, a check is made to see if the read request has been finished. The processes from step S1 are repeated until the end of the read request is obtained. On the other hand, when it is discriminated that the position flag is equal to the flag 2 indicative of the middle in step S1, in which number of middle position flag the request block exists is recognized in step S12, the compression data is extracted from the relevant position flag and supplied to the expanding circuit 50, and the supply of the compression data is stopped when the next position flag is detected. Thus, only the compression data in the middle corresponding to the request block is supplied to the expanding circuit 50 and reconstructed in the non-compression cache memory 42. The reconstructed data can be transferred to the host computer 10 in step S13.

When the position flag 3 is discriminated, processes in steps S14 to S16 are executed. When the compression group is read out from the disk drive in step S4, the position flag 3 is recognized by reference to the mapping table, the logic sector added with the position flag and the next logic sector are read out from the disk drive and are transferred to the compression cache memory 44. In the processes from step S14 in which the position flag 3 is judged, the compression data at the final position of the compression group which is specified by the position flag 3 is first supplied from the compression cache memory 44 to the expanding circuit 50 and is reconstructed. In step S15, the data is expanded from the head of the compression data as a next sector until the position flag 2 is detected and is developed in the non-compression cache memory 42. Finally, in step S16, the block developed in the non-compression cache memory 42 is transferred to the host computer 10. When the end of the read request is discriminated in step S17, the unnecessary data which remains in the compression cache memory 44 and non-compression cache memory 42 and becomes targets to be sequentially read is deleted in step S18, thereby assuring a using area of the cache. When a cache hit occurs in step S2, a check is made in step S6 to see if a hit has occurred in the non-compression cache memory 42. When the hit occurs in the non-compression cache memory, the request data in the non-compression cache memory 42 is transferred to the host computer 10 in step S7. When the hit occurs in the compression cache memory 44, the reading operation from the disk drive 14 in steps S3 and S4 is not performed but the processes from step S5 are immediately executed.

The embodiment of FIG. 29 in which the position flag is used to form the compression group has been described as an example with respect to the sequential writing process and sequential reading process in which no data is left in the cache memory. However, with respect to the writing process and reading process which use the cache memory according to the ordinary LRU system, the embodiment can be also applied in substantially the same manner as the case of forming the compression group by the compression blocks of the number that is integer times as large as the minimum physical sector in FIGS. 8A and 8B. In the above embodiment, with respect to the reconstruction of the compression block in the compression group read out from the disk drive into the compression cache memory 44, only the block requested from the host computer 10 is extracted and is developed into the non-compression cache memory 42. However, the compression blocks can be reconstructed on a compression group unit basis and can be developed in the non-compression cache memory 42. Thus, a hit ratio of the non-compression cache memory is raised and an overhead due to the expanding process in the case where a hit occurs in the compression cache memory can be reduced. Although the above embodiment has been described with respect to the example of the disk array of the RAID construction as a physical device, the invention can be also applied to an ordinary disk drive which doesn't have an array construction. The physical device is not limited to the foregoing magnetic disk drive but a proper external memory device such as optical disk drive, semiconductor memory device, or the like can be also used.

[Another operation environment]

FIG. 34 shows another operation environment of the disk control unit of the invention. Although the embodiment of FIG. 1 has been described as an example with respect to the case where the magnetic disk control unit is connected to the upper host computer, the operation environment of FIG. 34 is characterized in that the disk control unit of the invention is used as a disk server.

In FIG. 34, the disk control unit 12 of the invention having the disk drives 14-1 to 14-6 constructing a disk array is connected to the host computer 10 through a local area network (hereinafter, referred to as an "LAN") 200. In addition to the host computer 10, a workstation 202, a personal computer 204, and a printer 206 are connected to the LAN 200. Therefore, the disk control unit 12 of the invention functions as a disk server which accepts and processes requests from the host computer 10, workstation 202, and personal computer 204 as clients connected to the LAN 200. Further, the host computer 10 is connected to an external network communication line 210 through a communication control apparatus 208 and can function as a disk server which accepts requests from many clients exceeding the LAN 200 by the network connection. That is, not only the disk control unit of the invention can be connected to a number of personal computers and the host by the network connection, in the case where the disk control unit is connected in a worldwide scale, but also it is accessed day and night and the recording and reproduction of data are continued. Therefore, under such a connection form, it is indispensable to always efficiently store the data into the disk drive and it is not permitted to stop the apparatus by a segment cleaning of the disk drive in the middle of the process. Even in the disk control unit of the stand-alone type, the segment cleaning is executed while the user is using the apparatus, so that the work of the user is interrupted. Similarly, even in case of the disk control unit connected to a large scale host computer, the work is interrupted during the segment cleaning. In any case, the segment cleaning interrupts the process during the operation of the apparatus and a working efficiency of the apparatus is not improved. In such a case, according to the disk control unit of the invention, the segment cleaning process associated with the interruption of the process is eliminated. Particularly, an extremely large effect is obtained as a non-stop type disk server connected to the network of the worldwide scale that is accessed day and night.

What is claimed is:

1. A disk control apparatus comprising:

a physical device for receiving an allocation of a logic sector of a predetermined size and for reading and writing data on said logic sector unit basis;

a cache memory which is provided between an upper apparatus and said physical device and has a non-compression cache area for storing non-compression data on a logic block unit basis of said upper apparatus and a compression cache area for storing compression data on a unit basis of a compression group having the same size as that of the logic sector of said physical device;

a cache table in which at least an address in the cache, a compression flag indicating whether the data is the compression data or not, and an updating flag indicative of the presence or absence of the updating are registered by using a logic block number of said upper apparatus as an index and which is used to manage said cache memory;

a hit judging unit for judging whether data of a block number requested from said upper apparatus exists in said cache memory or not;

a compressing circuit unit for extracting and compressing the data stored in said non-compression cache area on said logic block unit basis;

a compression group forming unit for forming a compression group by collecting the compression data of the logic block unit by said compressing circuit unit and for storing said compression group into said compression cache area;

an expanding circuit unit for extracting and expanding the data stored in said compression cache area on said compression group unit basis and for developing the resultant data into said non-compression cache area;

a free linked list for managing an empty logic sector of said physical device;

a device writing unit for extracting the data stored in said compression cache area on said compression group unit basis and for writing said data into the logic sector which was obtained from said free linked list and is in a vacant state;

a mapping table in which at least a logic sector number indicative of a storing position in said physical device, a relative position in said logic sector, and the number of sectors are registered by using said request block number of said upper apparatus as an index and which is used to manage the compression data of said physical device;

a device reading unit for reading out the data in said physical device on said compression group unit basis and for transferring to said compression cache area;

a write cache control unit for processing a write request from said upper apparatus; and a read cache control unit for processing a read request from said upper apparatus.

2. An apparatus according to claim 1, wherein in the case where the size of said compression data compressed to the logic block unit of said upper apparatus is not a value that is integer times as large as a minimum physical sector of said physical device, said compressing circuit unit adds dummy data so that said size is integer times as large as said minimum physical sector.

3. An apparatus according to claim 1, wherein when a mishit is judged by said hit judging unit for the write request from said upper apparatus, said write cache control unit stores a write logic block into said non-compression cache area and notifies the end of the process to said upper apparatus.

4. An apparatus according to claim 1, wherein in the case where a hit in said non-compression cache area is judged by said hit judging unit for the write request from said upper apparatus, said write cache control unit updates the relevant logic block in said non-compression cache area by the write logic block from said upper apparatus and notifies the end of the process to said upper apparatus.

5. An apparatus according to claim 4, wherein when said logic block in said non-compression cache area is updated, said write cache control unit deletes the logic sector number of said compression group to which said updated logic block belongs from said mapping table and transfers to said free linked list, and further, said write cache control unit transfers the compression data of the other logic blocks belonging to said deleted compression group to said compression group forming unit and sets to combination candidates for forming a new group.

6. An apparatus according to claim 1, wherein in the case where a hit in said compression cache area is judged by said hit judging unit for the write request in which the logic block number was designated from said upper apparatus, said write cache control unit expands said hit compression data in said compression cache area by said expanding circuit unit, develops into said non-compression cache area, updates the developed data by the write logic block from said upper apparatus, and notifies the end of the process to said upper apparatus.

7. An apparatus according to claim 6, wherein when the logic block in said non-compression cache area is updated, said write cache control unit deletes the logic sector number of the compression group to which said updated logic block belongs from said mapping table, and transfers to said free linked list, and further, said write cache control unit transfers the compression data of the other logic blocks which belong to said deleted compression group to said compression group forming unit and sets to combination candidates for forming a new group.

8. An apparatus according to claim 1, wherein when the data is swept out from said non-compression cache area, said write cache control unit extracts the logic blocks in which the updating flag is set from said swept-out data with reference to said cache table, compresses the data by said compressing circuit unit, and supplies the resultant data as combination candidates to said group forming unit.

9. An apparatus according to claim 1, wherein said write cache control unit sweeps out the data from said non-compression cache area in accordance with an LRU.

10. An apparatus according to claim 1, wherein when the compression group is swept out from said compression cache area, said write cache control unit allocates the logic sector in the vacant state with reference to said free linked list and allows said logic sector to be written by said device writing unit, and, at the same time, registers the logic block numbers of said plurality of logic blocks which belong to the written compression group, logic sector number, relative position in the logic sector, and the number of sectors into said mapping table.

11. An apparatus according to claim 10, wherein said write cache control unit sweeps out said compression group from said compression cache area in accordance with an LRU.

12. An apparatus according to claim 1, wherein said compression group forming unit combines said compression data in accordance with the order of storing into a buffer memory of said compressing circuit unit, thereby forming said compression group.

13. An apparatus according to claim 1, wherein said compression group forming unit combines candidates in accordance with the order of the data compressed by said compressing circuit unit, thereby forming said compression group.

14. An apparatus according to claim 1, wherein said compression group forming unit detects the size of said compression data compressed by said compressing circuit unit, forms a candidate list classified by data size, and selects a plurality of candidates exceeding a specified size from said candidate list, thereby forming one compression group.

15. An apparatus according to claim 14, wherein said compression group forming unit selects a plurality of candidates of the same size from said candidate list, thereby forming one compression data group.

16. An apparatus according to claim 14, wherein said compression group forming unit selects a plurality of candidates of different sizes from said candidate list, thereby forming one compression data group.

17. An apparatus according to claim 1, wherein in the case where a total data size obtained by combining said plurality of candidates doesn't reach a specified compression group size, said compression group forming unit stores dummy data into the remaining empty area.

18. An apparatus according to claim 1, wherein said compression group forming unit limits the number of candidates to be combined to one compression group to a specified number.

19. An apparatus according to claim 1, wherein said compression group forming unit limits the number of candidates to be combined to one compression group to two or less or four or less.

20. An apparatus according to claim 1, wherein said compression group has a size that is integer times as large as that of the logic block of said upper apparatus.

21. An apparatus according to claim 20, wherein said compression group has a size that is $2^n$ times (n is an integer of 1, 2, 3, 4, ... ) as large as that of the logic block of said upper apparatus.

22. An apparatus according to claim 1, wherein said device writing unit adds information of said mapping table to said compression group and stores into said physical device, thereby enabling said mapping table to be reconstructed in the case where said mapping table fails.

23. An apparatus according to claim 1, wherein when said compression group is written, said write cache control unit selects the logic sector of said physical device to be stored from said free linked list by hashing.

24. An apparatus according to claim 23, wherein when said compression group is written, said write cache control unit selects the logic sector of said physical device to be stored from said free linked list by hashing in the same cylinder address.

25. An apparatus according to claim 1, wherein said read cache control unit controls in a manner such that in the case where a mishit is judged by said hit judging unit for the read request from said upper apparatus, the compression group of the relevant logic sector is read out from said physical device with reference to said mapping table by the logic block number of said read request, the relevant compression data is extracted and is expanded by said expanding circuit unit and is developed into said non-compression cache area, and thereafter, the developed data is transferred to said upper apparatus, and the process is finished.

26. An apparatus according to claim 1, wherein in the case where a hit in said non-compression cache area is judged by said hit judging unit for the read request from said upper apparatus, said read cache control unit transfers the relevant logic block from said non-compression cache area to said upper apparatus and finishes the process.

27. An apparatus according claim 1, wherein said read cache control unit controls in a manner such that in the case where a hit in said compression cache area is judged by said hit judging unit for the read request from said upper apparatus, the compression group including the relevant logic block is extracted from said compression cache area and is expanded by said expanding circuit unit and is developed into said non-compression cache area, the relevant logic block is transferred to said upper apparatus, and the process is finished.

28. An apparatus according to claim 1, wherein said read cache control unit controls in a manner such that in the case where a hit in said non-compression cache area is judged by said hit judging unit for said read request from said upper apparatus, only the compression data including the relevant logic block is extracted from said compression cache area and is expanded by said expanding unit and is developed into said non-compression cache area, and thereafter, the developed data is transferred to said upper apparatus, and the process is finished.

29. An apparatus according to claim 1, wherein said cache memory, said cache table, said hit judging unit, said compressing circuit unit, said compression group forming unit, said expanding circuit unit, said device writing unit, said mapping table, said device reading unit, said write cache control unit, and said read cache control unit are set to one system, and said upper apparatus commonly uses two said systems thereby constructing a duplexed system, and said physical device is shared by said two systems.

30. An apparatus according to claim 29, wherein each of said read cache control units in said two systems independently operates for the read request from said upper apparatus, and each of said write cache control units in said two systems controls in a manner such that in the case where new data from said upper apparatus is stored by a mishit judgment of the self cache memory of one of said two systems, said new data is copied into the cache memory of the other system and the cache table of the other system is updated, and in the case where hit data is updated by the new data from said upper apparatus by a hit judgment in the self cache memory of one of said two systems, said new data is copied into the cache memory of the other system and the cache table of the other system is updated.

31. An apparatus according to claim 1, wherein said compression group forming unit further adds a position flag indicative of a position in the group to a head position of each candidate when the compression group is formed, and said position flag is registered into said mapping table when the compression group is written into said physical device.

32. An apparatus according to claim 31, wherein said position flag indicates any one of a head position, a middle position in the group, and a middle position in a range from the end of the group to a head of the next group.

33. An apparatus according to claim 31, wherein said read cache control unit executes the expansion of the compressed compression data of a logic block unit by using the position flag in said compression group.

34. An apparatus according to claim 1, wherein said cache memory is a non-volatile memory.

35. An apparatus according to claim 1, wherein said mapping table is stored in a non-volatile memory.

36. An apparatus according to claim 1, wherein in the case where said physical device uses a detachable medium, said mapping table is stored to said medium before said medium is ejected, and said mapping table is read out from said medium and is developed by an initializing process when said medium is inserted.

37. An apparatus according to claim 1, wherein said physical device is a magnetic disk device, an optical disk device, or a semiconductor memory device.

38. An apparatus according to claim 1, wherein said physical device is a disk array apparatus having a plurality of disk devices.

39. A disk control apparatus comprising:

a physical device for reading and writing data on a logic sector unit basis of a predetermined size;

a cache memory having a compression cache area for storing compression data on a unit basis of a compression group having the same size as that of a logic sector of said physical device;

a cache table in which an address in the cache, a compression flag indicating whether data is the compression data or not, and an updating flag indicative of the presence or absence of the updating are registered by using a logic block number of an upper apparatus as an index;

a compressing circuit unit for compressing non-compression data on said logic block unit basis;

a compression group forming unit for collecting the compression data of a logic block unit by said compressing circuit unit and for storing into said compression cache area;

an expanding circuit unit for extracting and expanding the data stored in said compression cache area on said compression group unit basis;

a free linked list for managing a vacant logic sector of said physical device;

a device writing unit for extracting the data stored in said compression cache area on said compression group unit basis and for writing into the logic sector in an empty state obtained from said free linked list;

a mapping table in which a logic sector number indicative of a storing position of said physical device, a relative position in the logic sector, and the number of sectors are registered by using a request block number of said upper apparatus as an index;

a device reading unit for reading out the data of said physical device on said compression group unit basis and for transferring into said compression cache area;

a write cache control unit for processing a write request from said upper apparatus; and a read cache control unit for processing a read request from said upper apparatus.

* * * * *